(12) United States Patent
Gillett et al.

(10) Patent No.: US 8,960,793 B2
(45) Date of Patent: Feb. 24, 2015

(54) BOOSTER SEAT

(75) Inventors: Sharon A. Gillett, Mohnton, PA (US); Michael H. Gillett, Mohnton, PA (US); Curtis M. Hartenstine, Birdsboro, PA (US); Guang-Hui Zhao, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 314 days.

(21) Appl. No.: 13/338,460

(22) Filed: Dec. 28, 2011

(65) Prior Publication Data

US 2012/0175922 A1 Jul. 12, 2012

Related U.S. Application Data

(60) Provisional application No. 61/460,815, filed on Jan. 7, 2011.

(30) Foreign Application Priority Data

Nov. 4, 2011 (CN) .......................... 2011 1 0348933

(51) Int. Cl.
*B60N 2/28* (2006.01)
*B60N 2/46* (2006.01)
*B60N 3/10* (2006.01)

(52) U.S. Cl.
CPC ............ *B60N 2/2821* (2013.01); *B60N 2/2872* (2013.01); *B60N 2/2881* (2013.01); *B60N 2/462* (2013.01); *B60N 3/10* (2013.01)
USPC ................ 297/250.1; 297/188.08; 297/411.3; 297/440.1

(58) Field of Classification Search
USPC ......... 297/144, 188.08, 250.1, 411.27, 411.3, 297/411.34, 440.1
See application file for complete search history.

(56) References Cited

U.S. PATENT DOCUMENTS

| 1,898,008 | A | * | 2/1933 | Fox ................................ 296/63 |
| 1,993,437 | A | * | 3/1935 | Ferguson Reginald A ... 297/170 |
| 4,858,869 | A | * | 8/1989 | Stang .......................... 248/311.2 |
| 5,964,502 | A | | 10/1999 | Stephens |
| 6,467,839 | B1 | * | 10/2002 | Kain ......................... 297/188.14 |
| 6,478,372 | B1 | * | 11/2002 | Lemmeyer et al. ...... 297/188.18 |
| 6,520,586 | B2 | * | 2/2003 | Park .......................... 297/411.32 |
| 7,066,536 | B2 | * | 6/2006 | Williams et al. ........... 297/250.1 |
| 7,131,692 | B2 | | 11/2006 | Huang |
| 8,256,836 | B2 | * | 9/2012 | Haut ......................... 297/188.14 |
| 2003/0151282 | A1 | | 8/2003 | Williams et al. |

FOREIGN PATENT DOCUMENTS

| CN | 200720042450.2 | 10/2008 |
| CN | 200910114928.1 | 7/2009 |
| CN | 200920141670.X | 12/2009 |
| CN | 200920185545.9 | 5/2010 |

(Continued)

*Primary Examiner* — Peter Brown
(74) *Attorney, Agent, or Firm* — David I. Roche; Baker & McKenzie LLP

(57) ABSTRACT

A child booster seat includes a seat shell, and armrests that can be conveniently placed in an outer envelop of the seat shell. The armrests can be placed in a storage cavity of the seat shell, and deployed outside the storage cavity for use. When the armrests are received in the seat shell, the outer envelop of the booster seat can substantially match with the outer contour shape of the seat shell. The booster seat can thereby occupy a smaller volume.

19 Claims, 26 Drawing Sheets

(56) References Cited

FOREIGN PATENT DOCUMENTS

| | | |
|---|---|---|
| CN | 200920190297.7 | 5/2010 |
| EP | 0751034 B1 | 9/1999 |
| GB | 2262511 A | 6/1993 |
| GB | 2414660 A | 12/2005 |
| GB | 2415367 A | 12/2005 |
| JP | 10338066 | 12/1998 |
| JP | 2001-047903 | 2/2001 |
| JP | 2001-047904 | 2/2001 |
| JP | 20106363 A | 1/2010 |
| JP | 2010202016 A | 9/2010 |
| WO | 2004024492 A1 | 3/2004 |

* cited by examiner

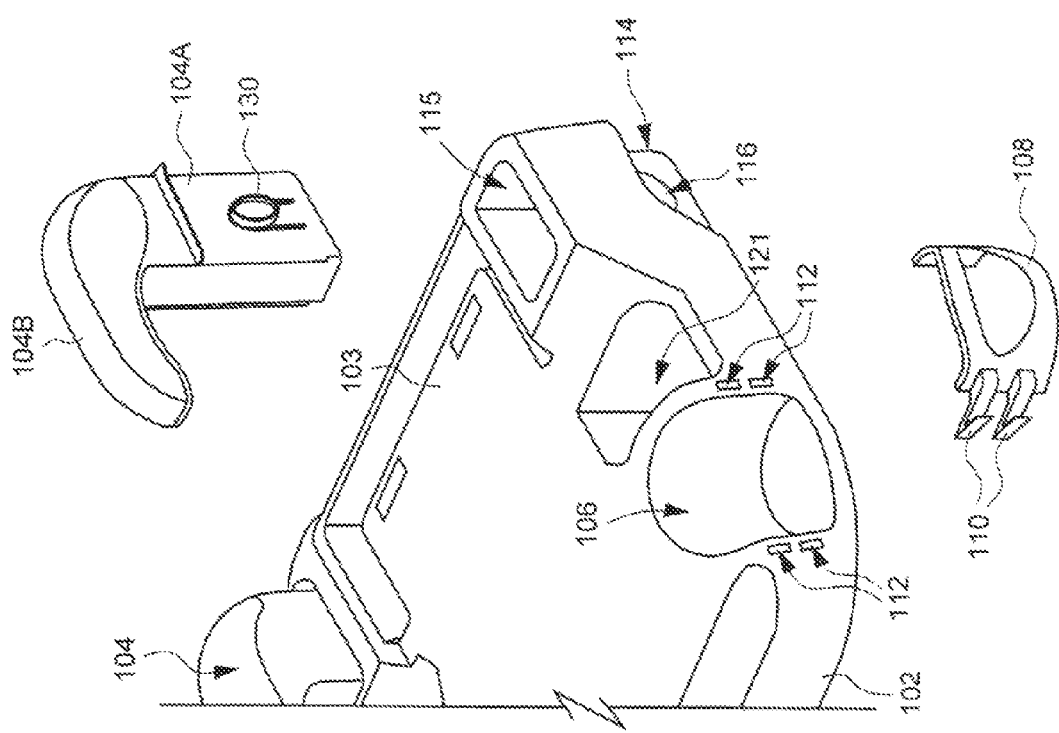

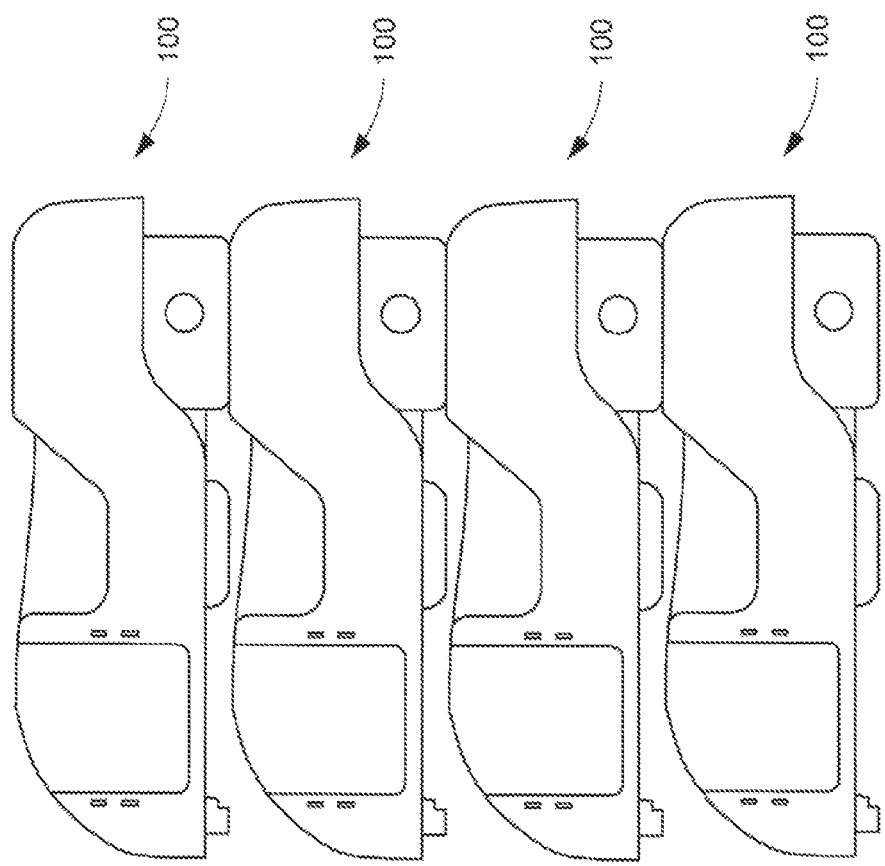

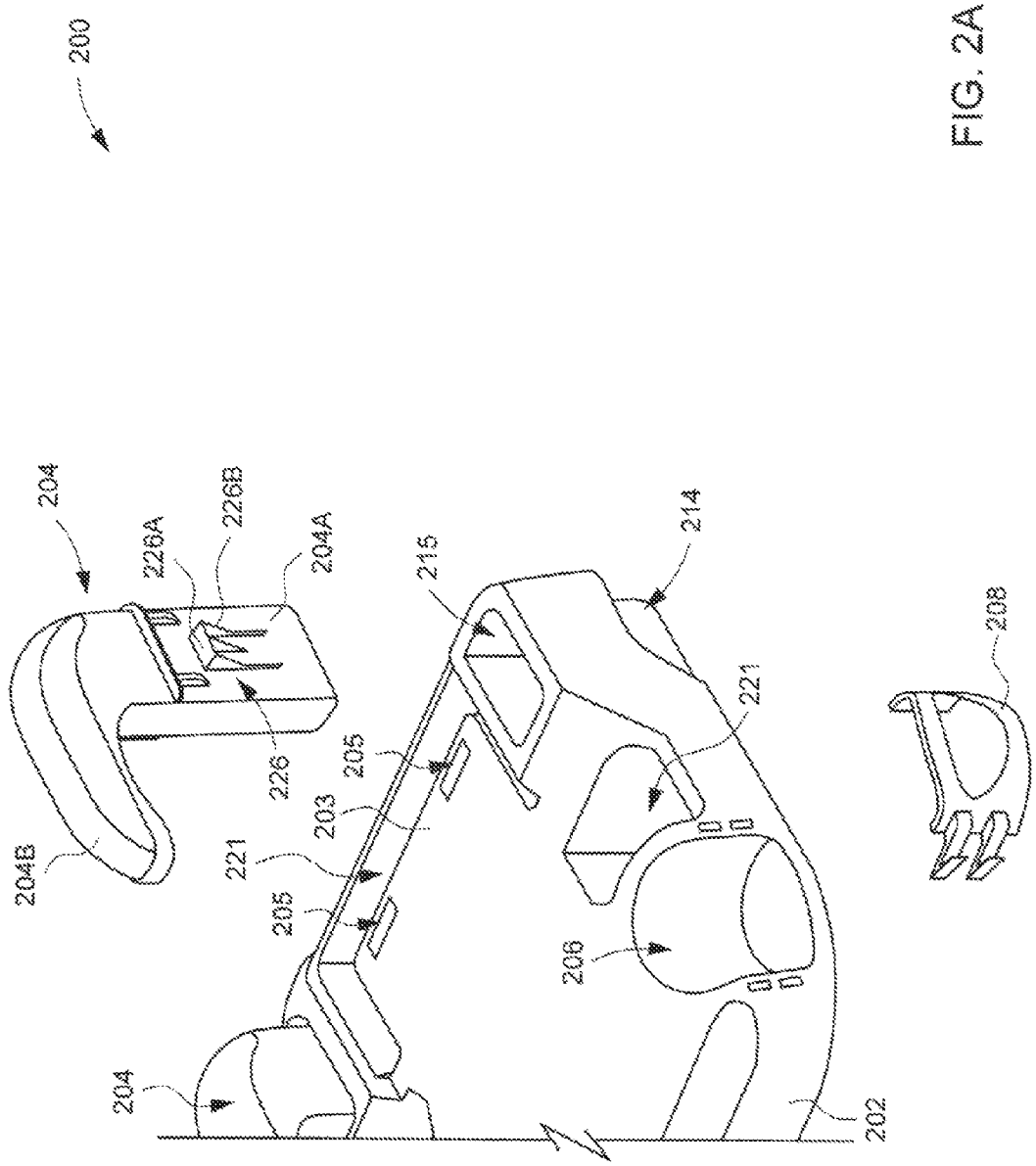

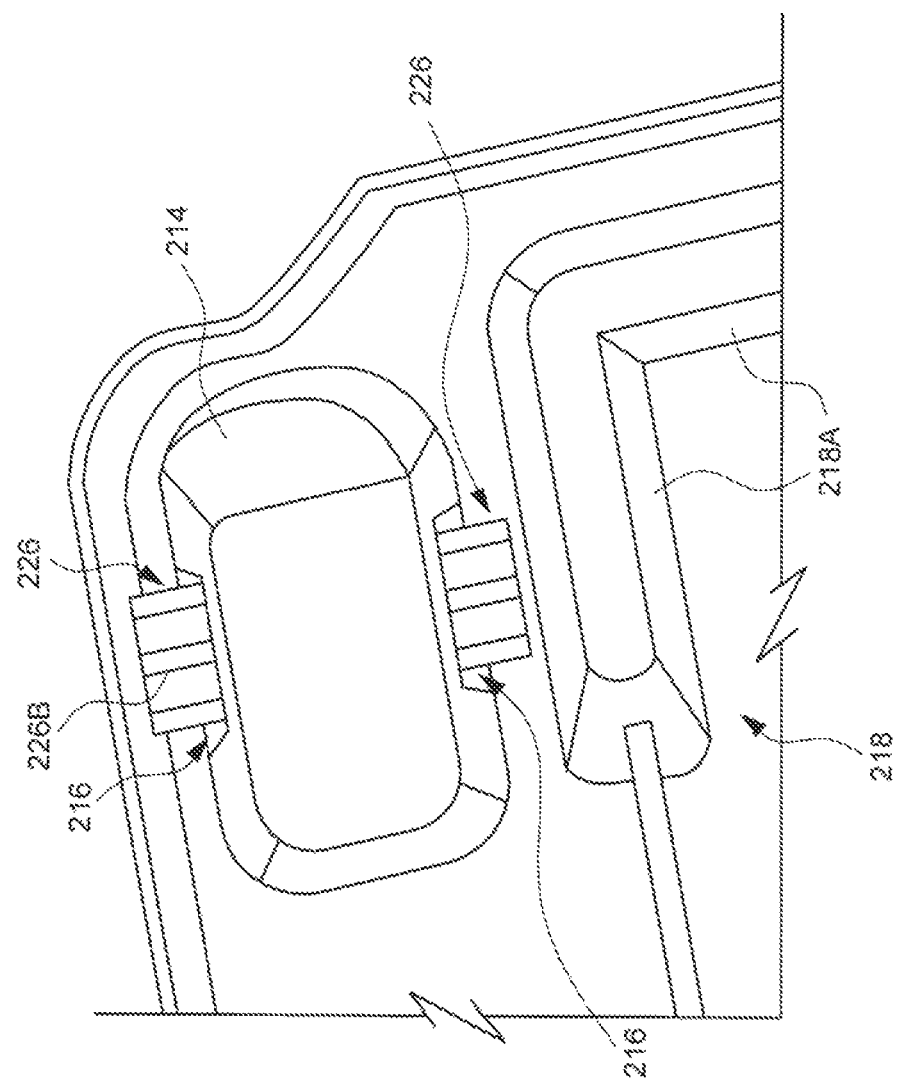

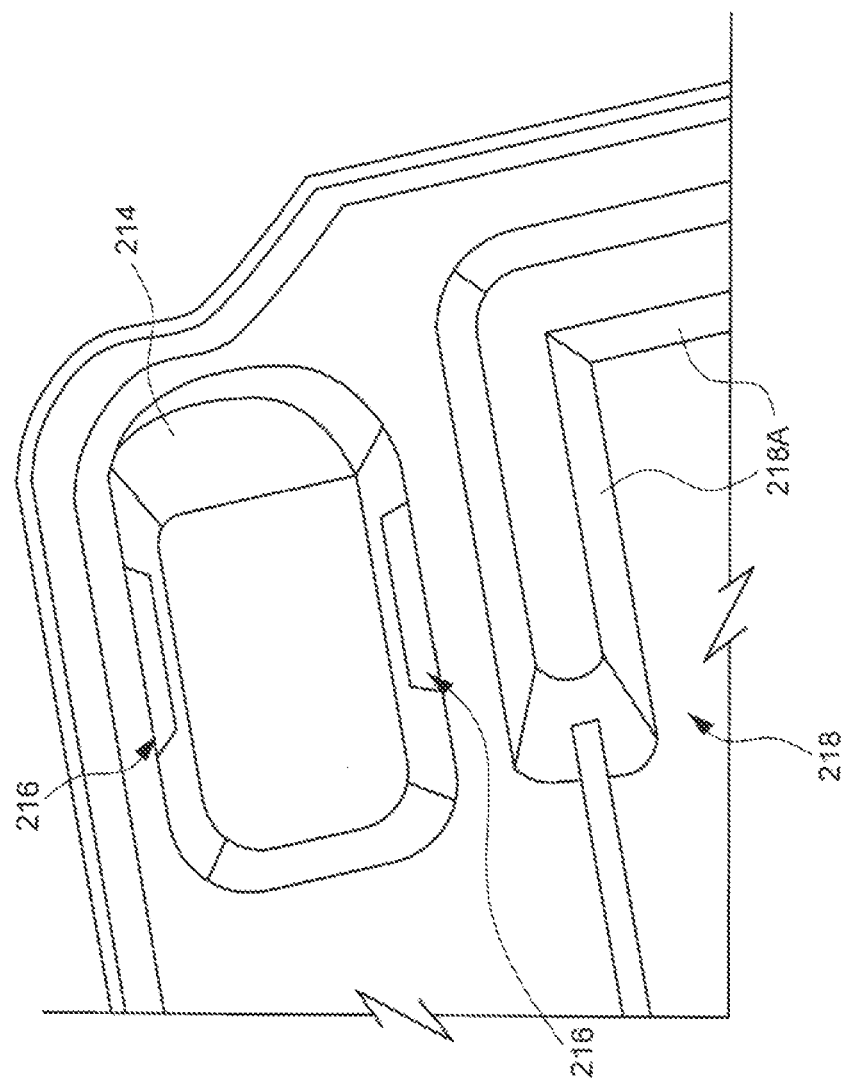

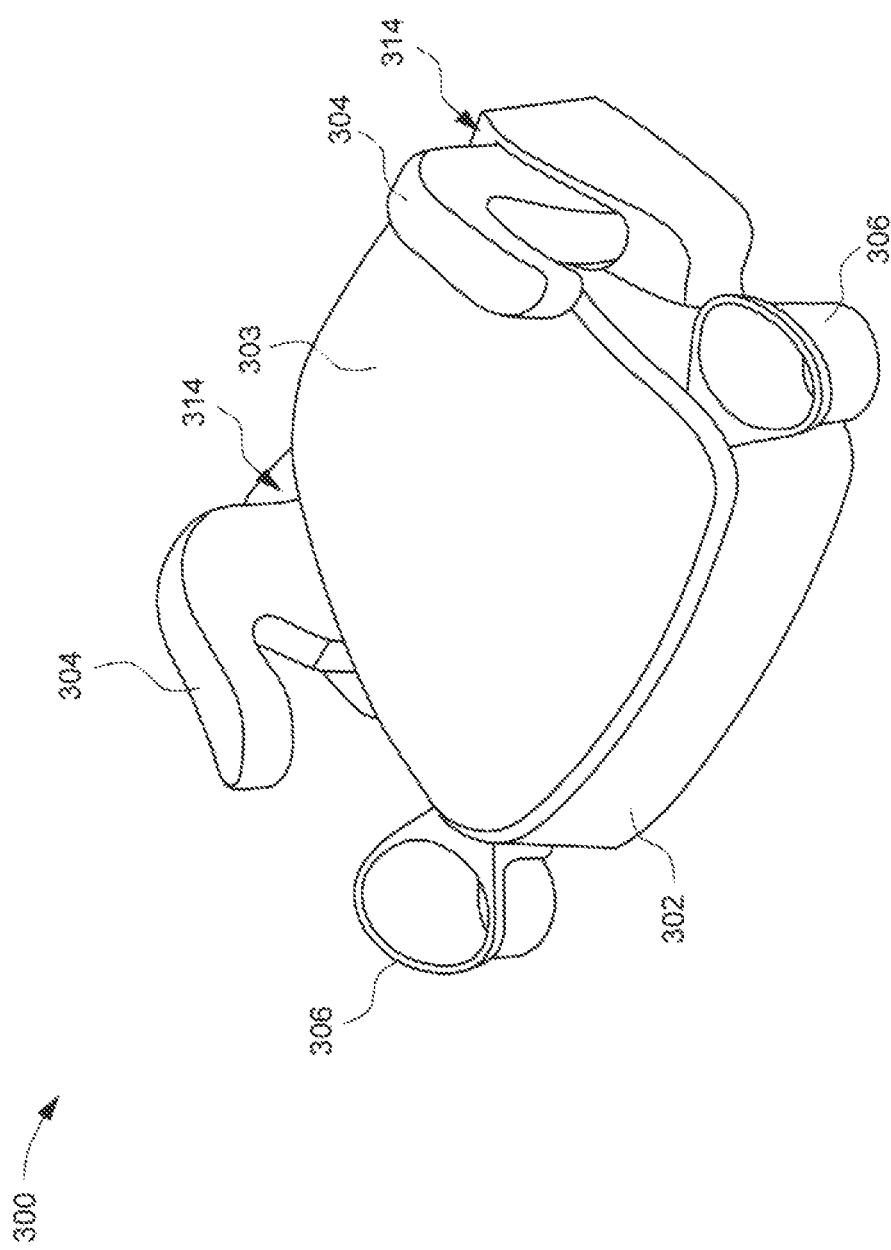

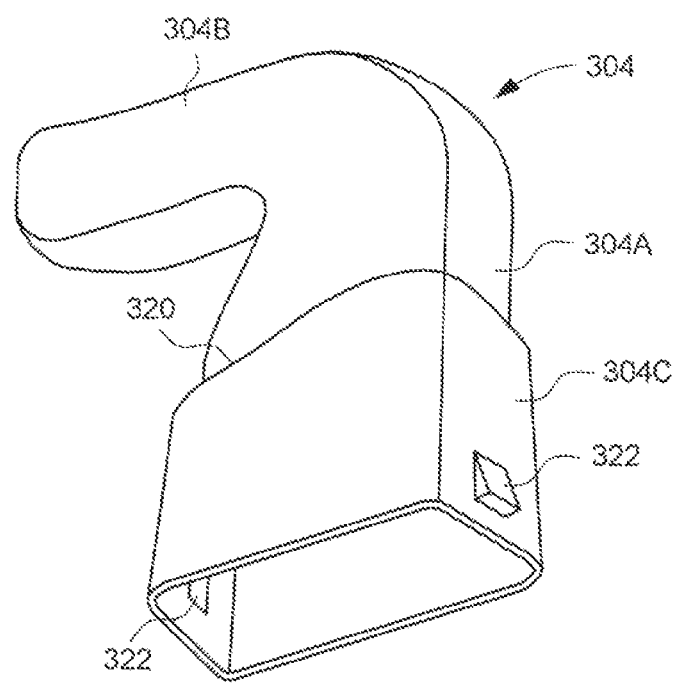
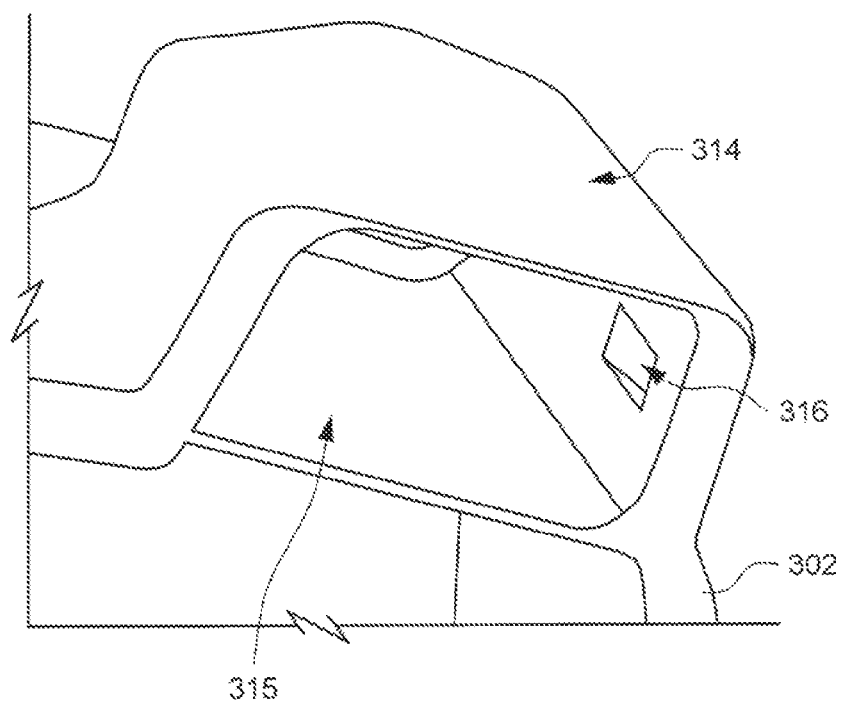
FIG. 3C

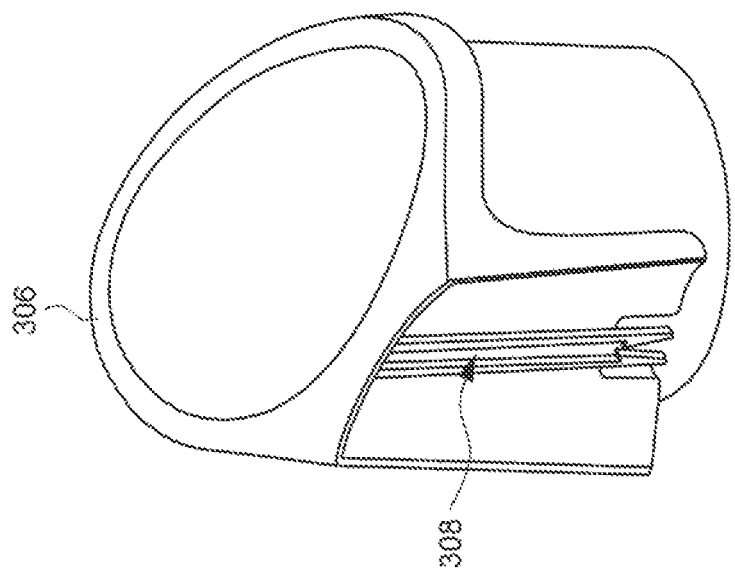
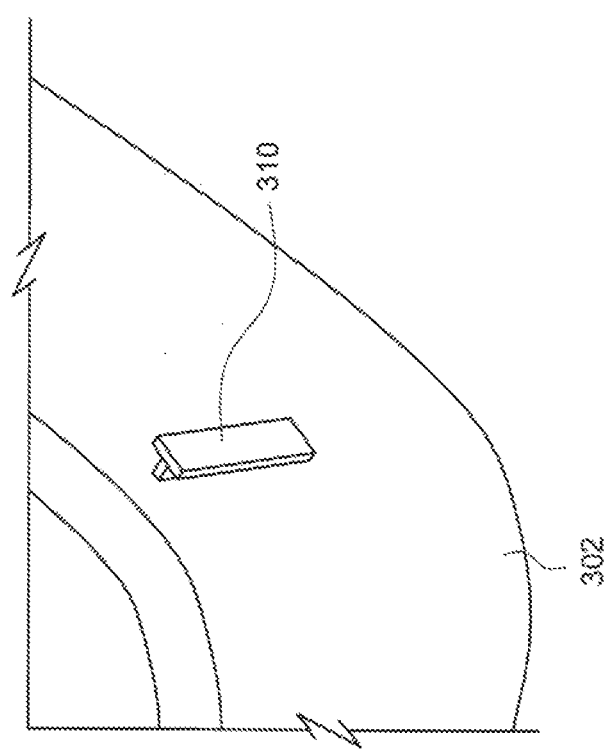
FIG. 3D

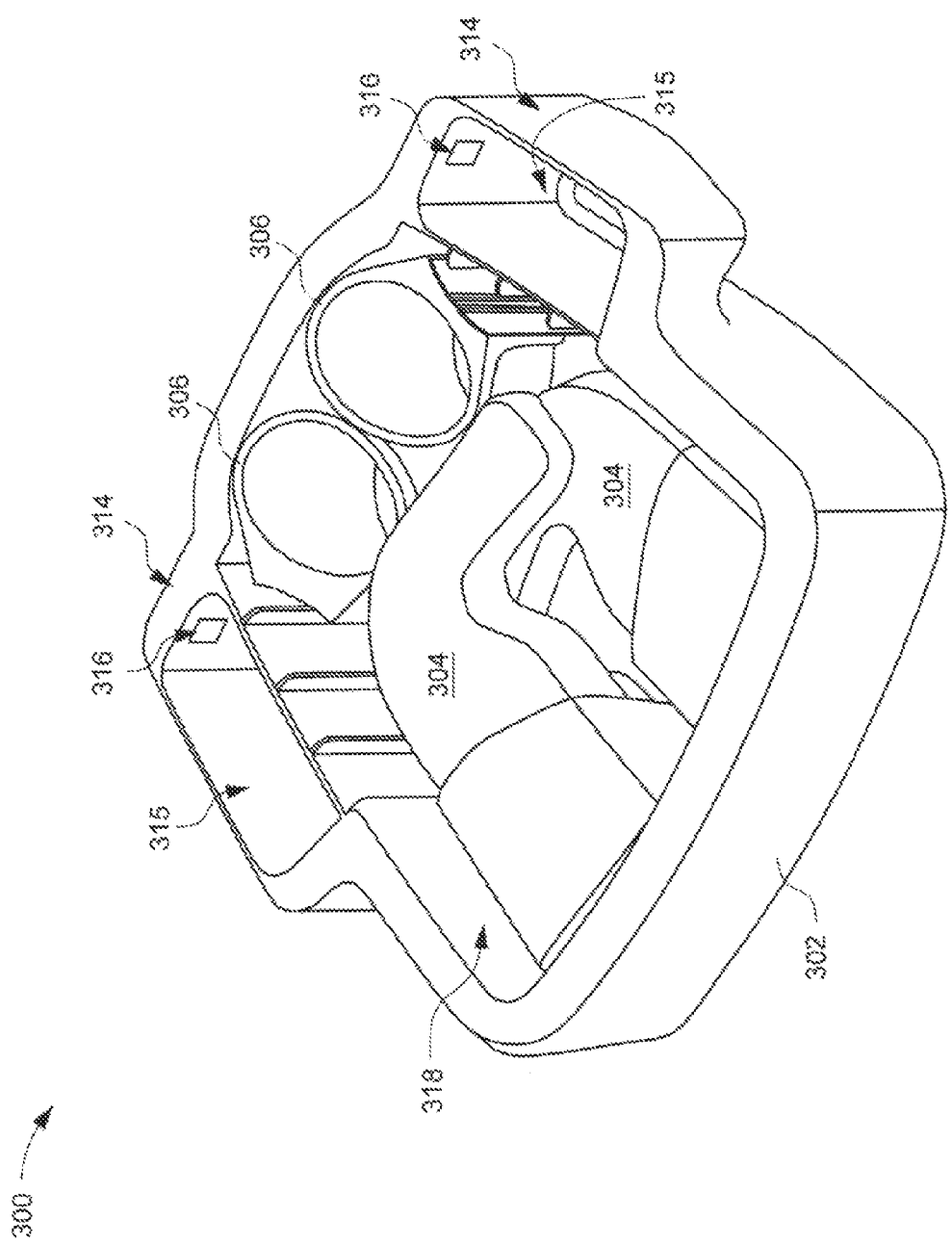

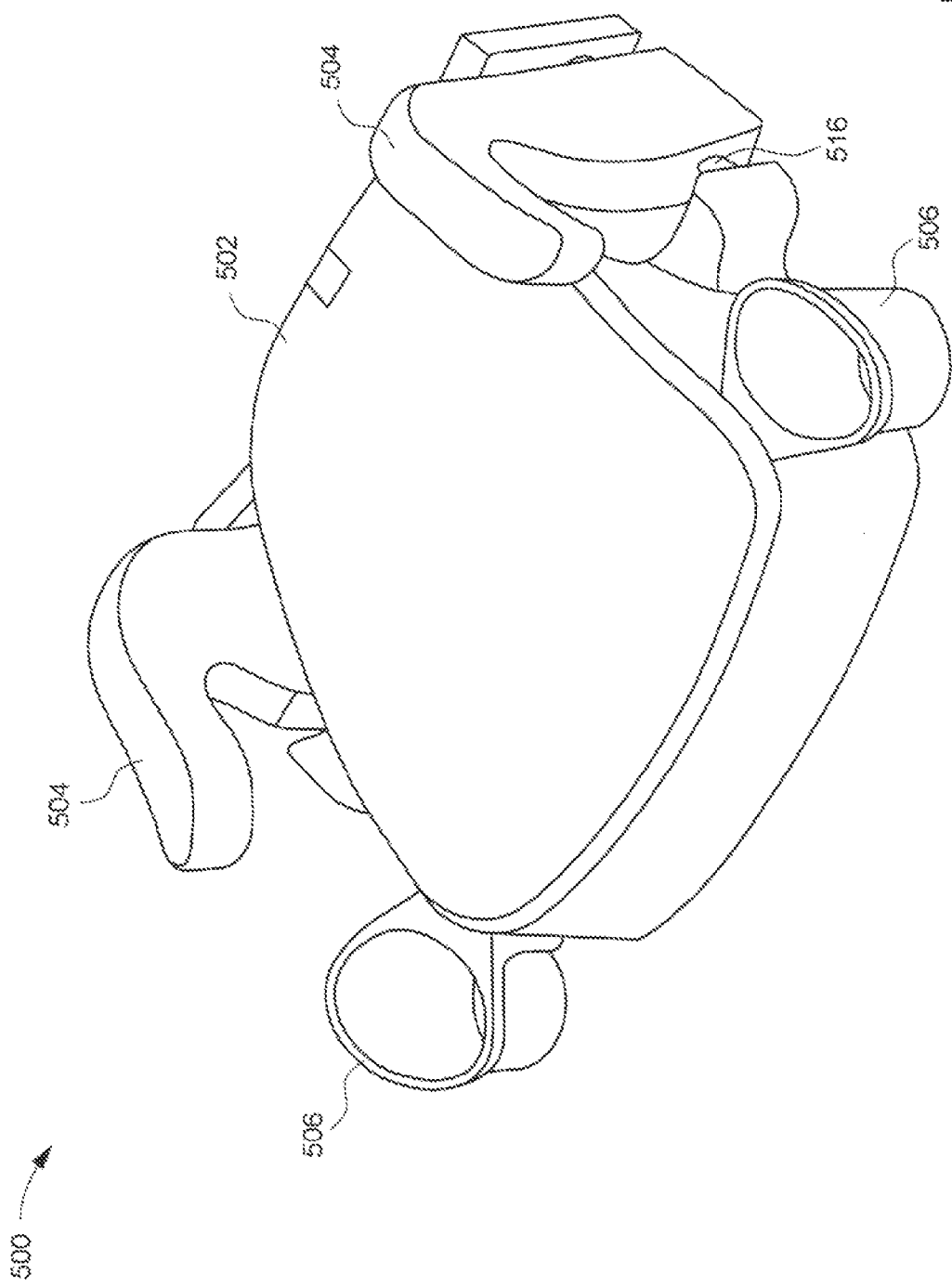

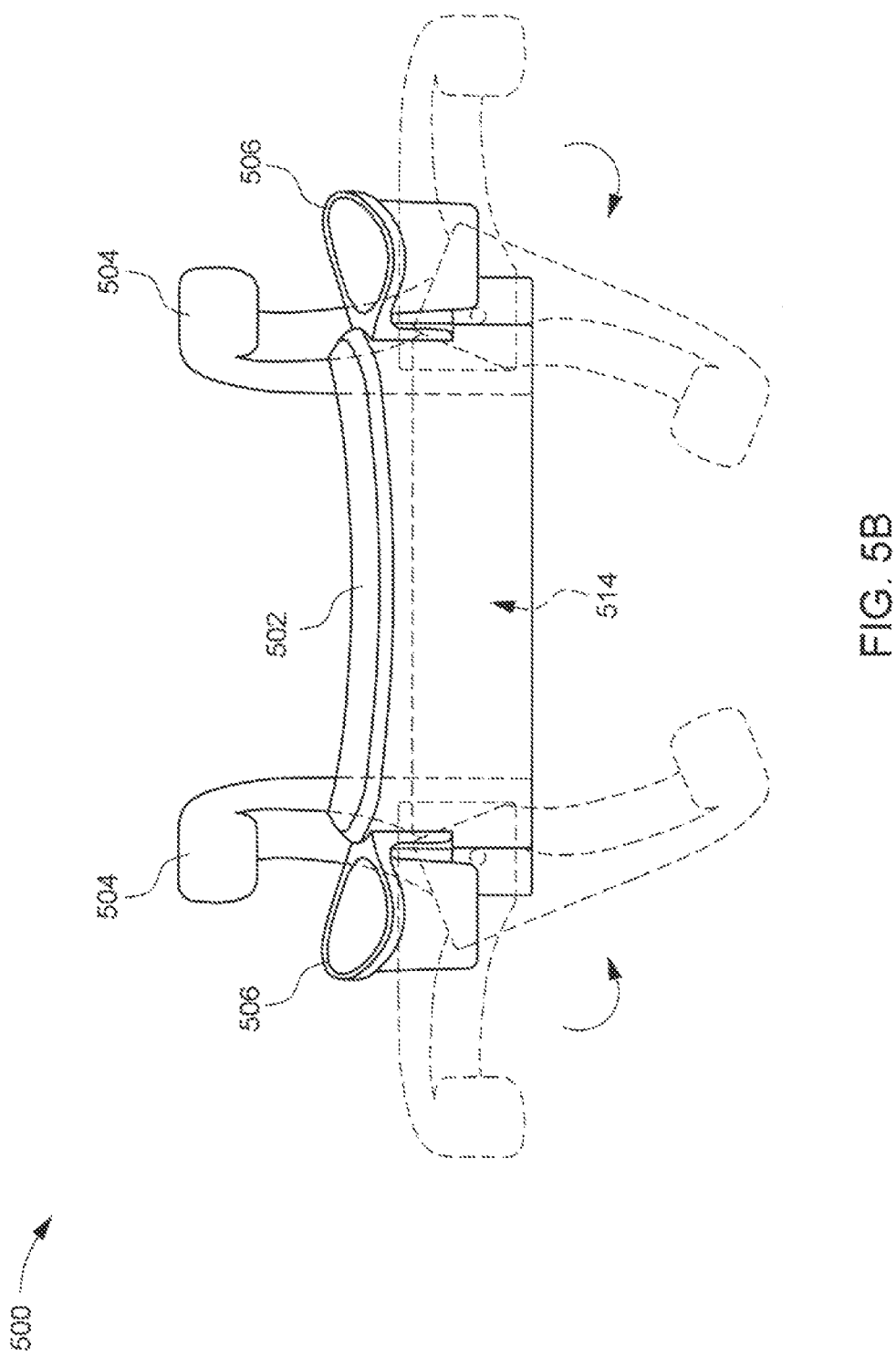

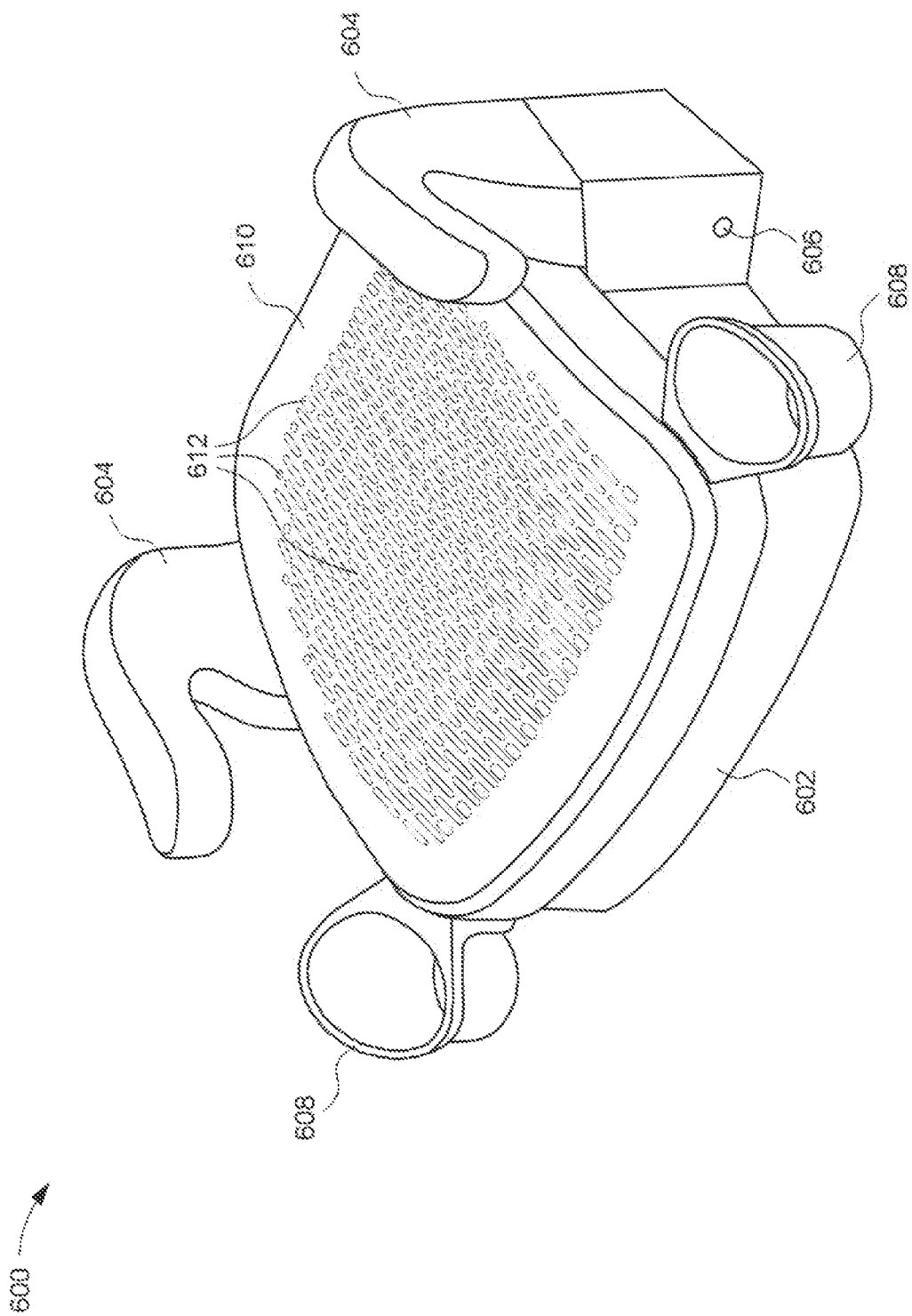

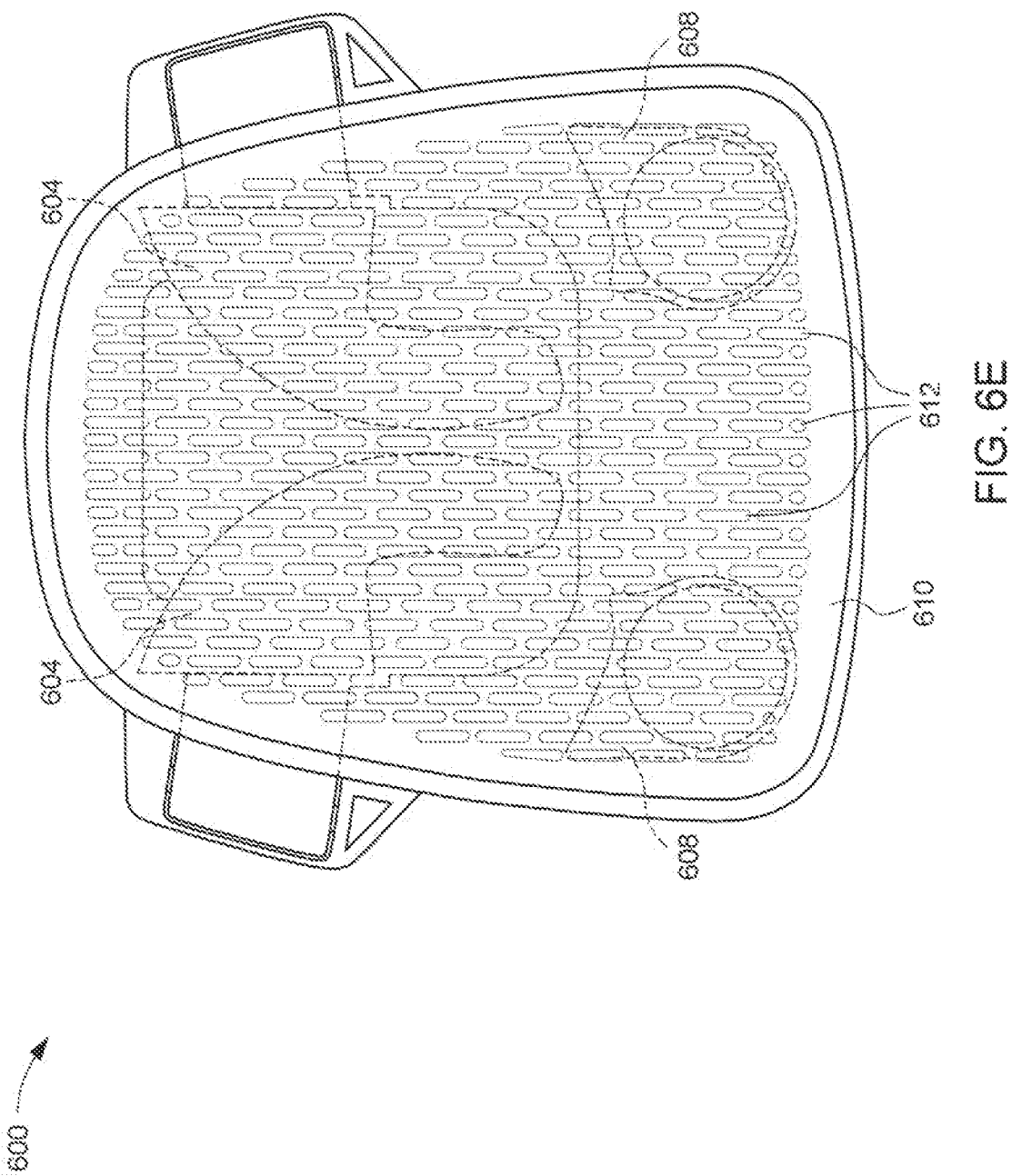

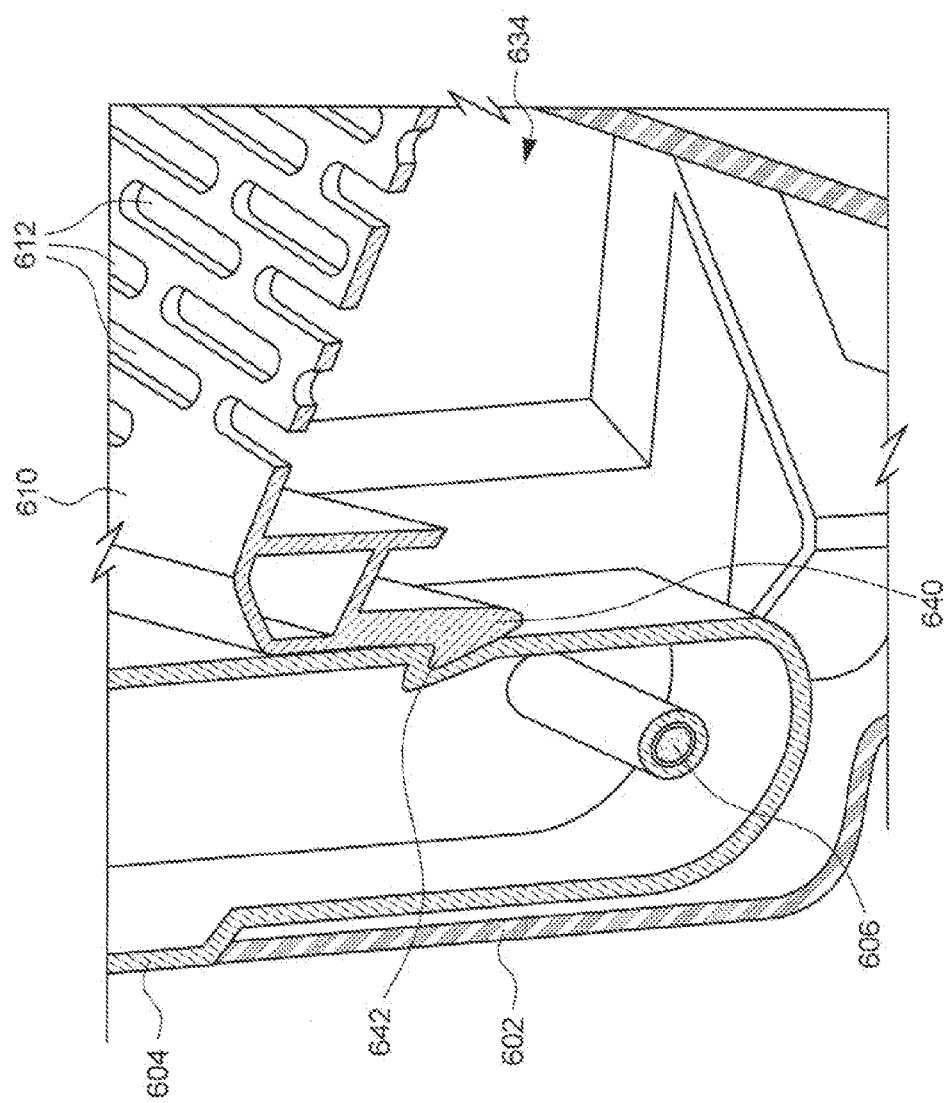

BOOSTER SEAT

CROSS-REFERENCE TO RELATED APPLICATIONS

This application claims priority to U.S. Provisional Patent Application No. 61/460,815 filed on Jan. 7, 2011, and to China Patent Application No. 201110348933.6 filed on Nov. 4, 2011.

BACKGROUND OF THE INVENTION

1. Field of the Invention

The present invention relates to child booster seats, and more particularly to a child booster seat structure that can be arranged in a compact manner.

2. Description of the Related Art

Car safety seats for children are commercially available in many types to match the age, weight, and size of the child being transported. For example, a young child can initially use an infant car seat that is installed facing rearward in the vehicle, and includes an independent harness for securely holding the child. As the child grows in size and maturity level, the infant car seat may be no longer appropriate or needed. In this case, a booster seat can be used to seat the child at a raised position, such that the vehicle's seatbelt can be used to safely hold the child. In addition to the aforementioned function of raising the child up, the booster seat may include other convenient features, such as armrests and cup holders. However, these additional features may increase the volume of the booster seat, which is less convenient to store.

Therefore, there is a need for an improved booster seat that can be manufactured in a cost-effective manner and address at least the foregoing issues.

SUMMARY

The present application describes child booster seats that include a seat shell, and armrests that can be placed in an outer envelop of the seat shell. The armrests can be either placed in a storage cavity of the seat shell, or deployed outside the storage cavity for use. When the armrests are stored in the seat shell, the outer envelop of the booster seat can substantially match with an outer contour shape of the seat shell. Accordingly, the booster seat can occupy a smaller volume and be disposed in a smaller package box for convenient storage. In alternate embodiments, the storage of the armrests in the seat shell can also permit to stack up multiple booster seats in a compact manner, which can reduce the shipment cost of the booster seats.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

BRIEF DESCRIPTION OF THE DRAWINGS

FIG. 1C is a schematic view illustrating how an armrest and a cup holder can be detachably assembled with a seat shell in the first embodiment;

FIG. 1F is a schematic view illustrating multiple booster seats of the first embodiment stacked upon one another;

FIG. 2A is a perspective view illustrating a second embodiment of a booster seat;

FIG. 2B is an enlarged view illustrating a bottom side of the seat shell of the second embodiment;

FIG. 2C is a partially enlarged view illustrating a bottom side of the seat shell of the second embodiment without assembly of the armrest;

FIG. 3A is a perspective view illustrating a third embodiment of a booster seat;

FIG. 3C is a schematic view illustrating how an armrest can be assembled with a seat shell in the third embodiment;

FIG. 3D is schematic view illustrating how a cup holder can be assembled with a seat shell in the third embodiment;

FIG. 3E is a schematic view of the third embodiment in a configuration where the armrests are received in the seat shell;

FIG. 5A is a perspective view illustrating a fifth embodiment of a booster seat;

FIG. 5B is a schematic front view illustrating how adjustable armrests are operable to store in the seat shell of the fifth embodiment;

FIG. 6A is a perspective view illustrating a sixth embodiment of a booster seat;

FIG. 6E is a schematic top view illustrating the booster seat shown in FIG. 6A with the armrests and cup holders stored therein; and FIG. 6F is a schematic cross-sectional view taken along section C of FIG. 6B.

DETAILED DESCRIPTION OF THE EMBODIMENTS

Figure 1A:
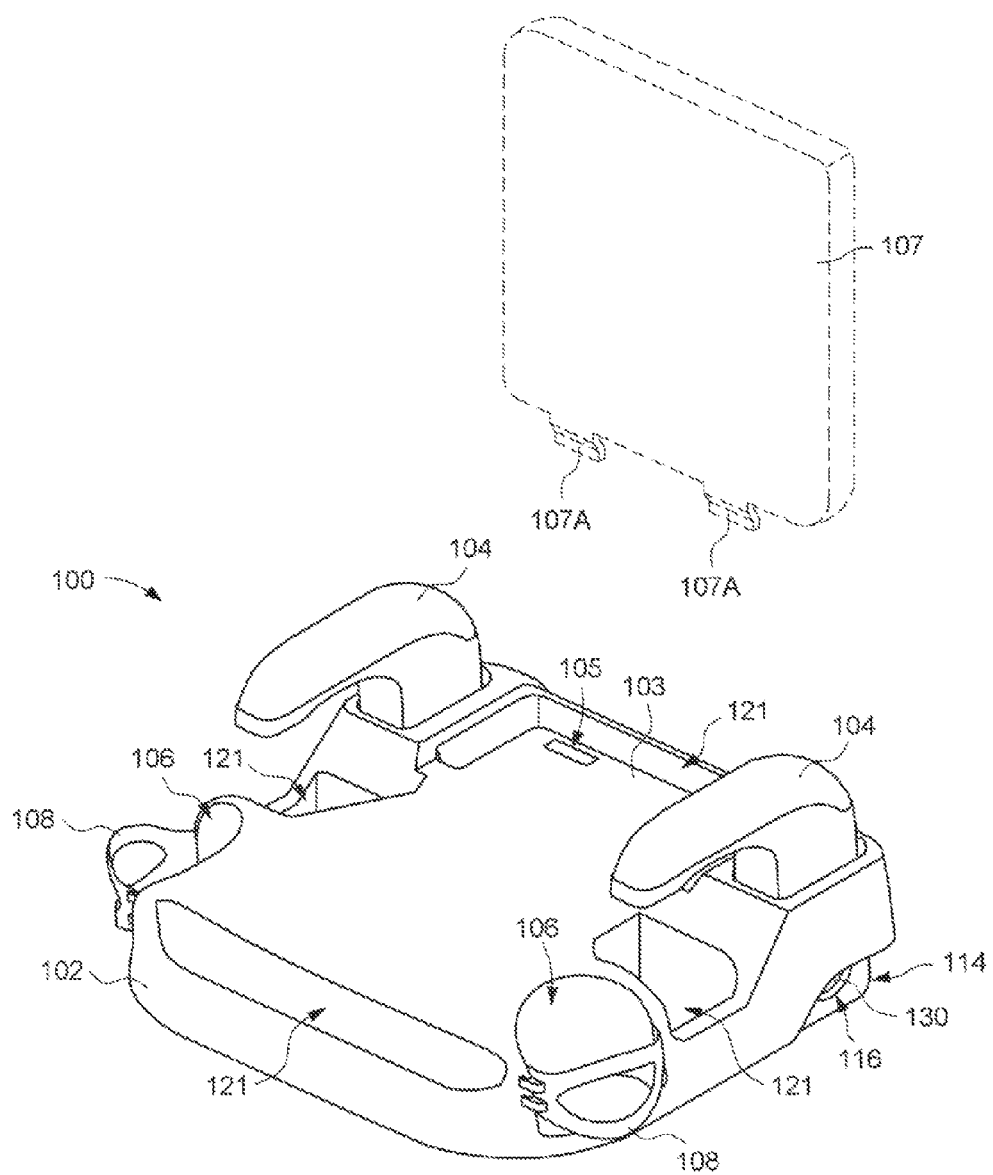
FIG. 1A is a perspective view illustrating a first embodiment of a booster seat.
Figure 1B:
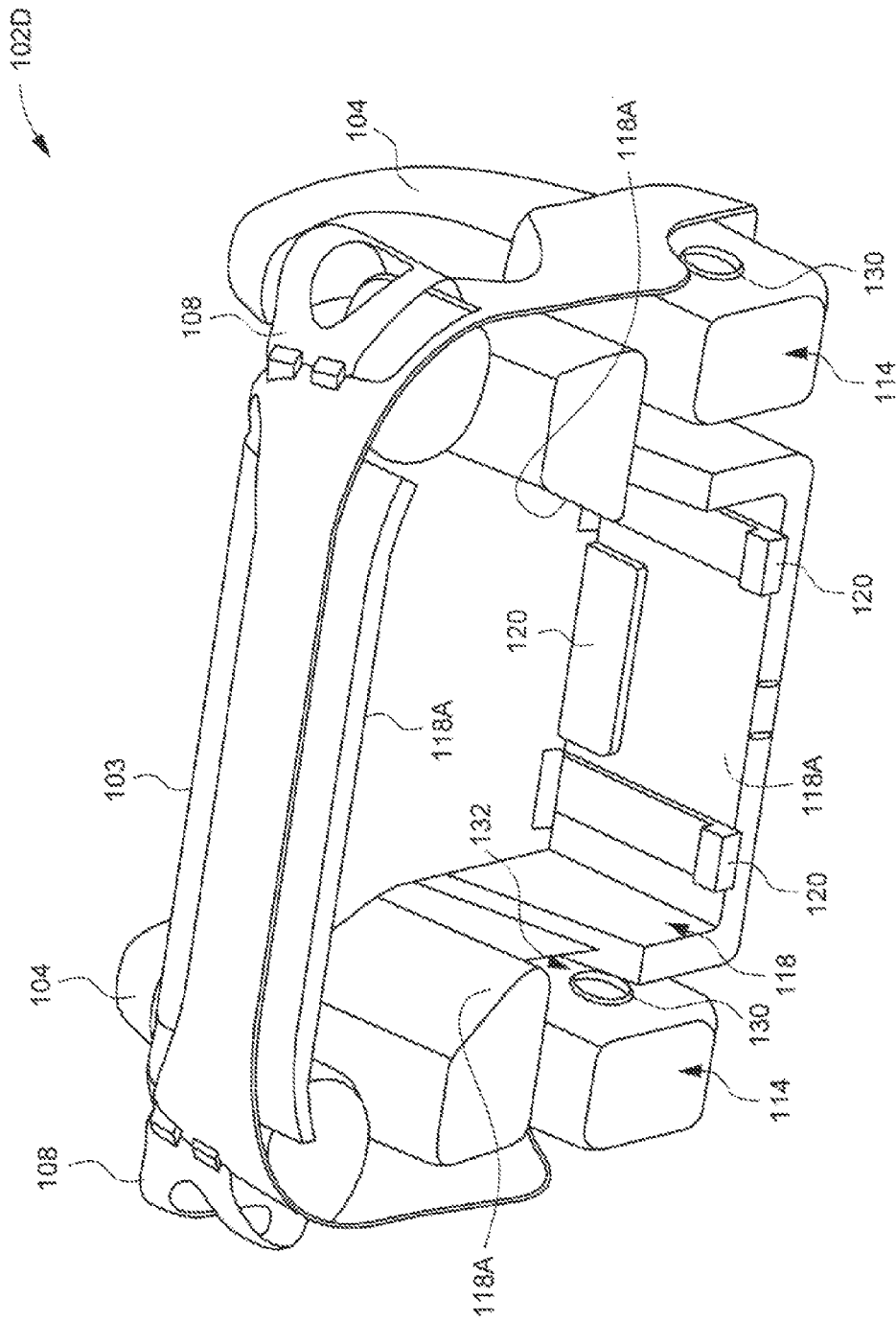
FIG. 1B is a perspective view illustrating a bottom side of the first embodiment.

The present application describes child booster seats that include a seat shell, and armrests that can be conveniently placed within an outer envelop of the seat shell. The armrests can be stowed in a storage cavity of the seat shell, and deployed outside the storage cavity for use of the booster seat. When the armrests are stored in the seat shell, the outer envelop of the booster seat can substantially match with the outer contour shape of the seat shell. Accordingly, the volume of the booster seat can be reduced to a compact size, which can be packed with a smaller package box. Shipment costs can be thereby reduced. Multiple embodiments of the booster seats are described hereafter with reference to FIGS. 1A through 6F.

FIGS. 1A through 1E are schematic views illustrating a first embodiment of a child booster seat 100. The booster seat 100 can include a seat shell 102 and armrests 104. The seat shell 102 can be formed in a single body, for example by injection or blow molding of plastic material. The seat shell 102 can have a generally oblong or square shape. The upper side of the seat shell 102 can include a support surface 103 on which a child can be seated. The support surface 103 toward the rear of the seat shell 102 can also include slits 105 through which resilient latches 107A of a backrest 107 (shown with phantom lines) can be engaged to assemble the backrest 107 with the seat shell 102. It is worth noting that the backrest 107 may be provided as an optional accessory that can be removable when unused. While the aforementioned construction uses a specific snap engagement, any attachment structures in general may be suitable to attach the backrest 107 with the seat shell 102.

Right and left front corners of the seat shell 102 can respectively include recessed cavities 106 where cup holders 108 can be detachably mounted to hold drinking bottles, cups or containers. As better shown in FIG. 1C, each of the cup holders 108 can be formed as a bracket having latch prongs 110 that can snap into slits 112 formed on an outer side surface of the seat shell 102 to attach the cup holder 108.

Right and left sides of the seat shell 102 can respectively include mount sockets 114 for detachably mounting the armrests 104. As better shown in FIGS. 1B and 1C, each of the mount sockets 114 can include a pocket 115 that is closed at the lower side and opened at the upper side of the seat shell 102. Each of the mount sockets 114 can include lateral sidewalls provided with latch openings 116 for locking the associated armrest 104 in place.

The seat shell 102 can further include an inner storage cavity 118 accessible from the lower side of the seat shell 102 and located at a central region between the two mount sockets 114. In one embodiment, the storage cavity 118 can be defined at the underside of the support surface 103 via molding of the seat shell 102. The storage cavity 118 can be at least partially delimited or surrounded by a plurality of sidewalls 118A at the front, rear, right and left side of the seat shell 102. One of the sidewalls 118A (e.g., the rear one) can be provided with retainer tabs 120 for holding accessory elements, such as instruction manuals, brochures etc. The storage cavity 118 can have a size adapted to receive the placement of the armrests 104, which can be thereby accommodated in an outer envelop of the seat shell 102.

Referring again to FIG. 1A, the seat shell 102 can also include a plurality of pockets or recesses 121 formed at the upper side of the seat shell 102. These pockets or recesses 121 can facilitate hand gripping of the seat shell 102. The bottom surface of the pockets or recesses 121 can also provide additional support for the seat shell 102. Other than the above uses, alternate embodiments may also have the pockets or recesses 121 configured to receive a lower portion of the backrest 107 to hold the backrest 107 with the seat shell 102.

Figure 1D:
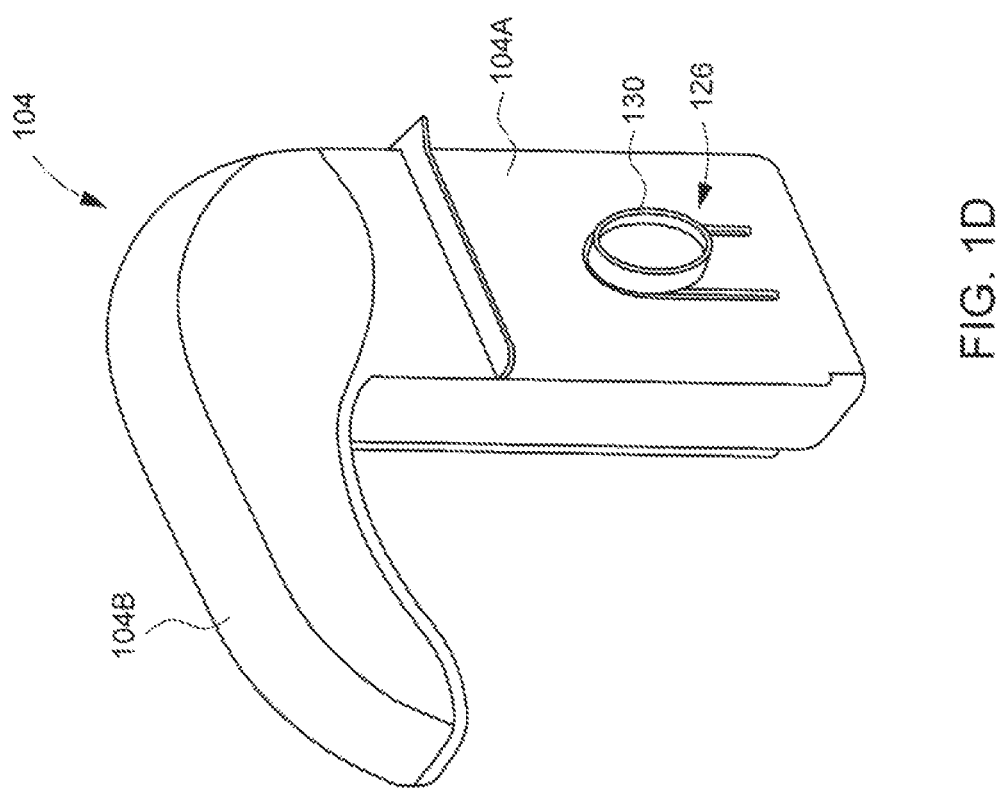
FIG. 1D is a schematic view illustrating one armrest of the first embodiment.

As better shown in FIGS. 1C and 1D, each of the armrests 104 can have a generally L-shape including an elongated stem 104A upwardly joined with an arm resting portion 104B. The stem 104A can have two opposite sidewall surfaces respectively provided with detents 126. Each of the detents 126 can be formed as a resilient tab that includes a protruding stud 130 adapted to engage with the corresponding latch opening 116 to lock the armrest 104 in place.

Figure 1E:
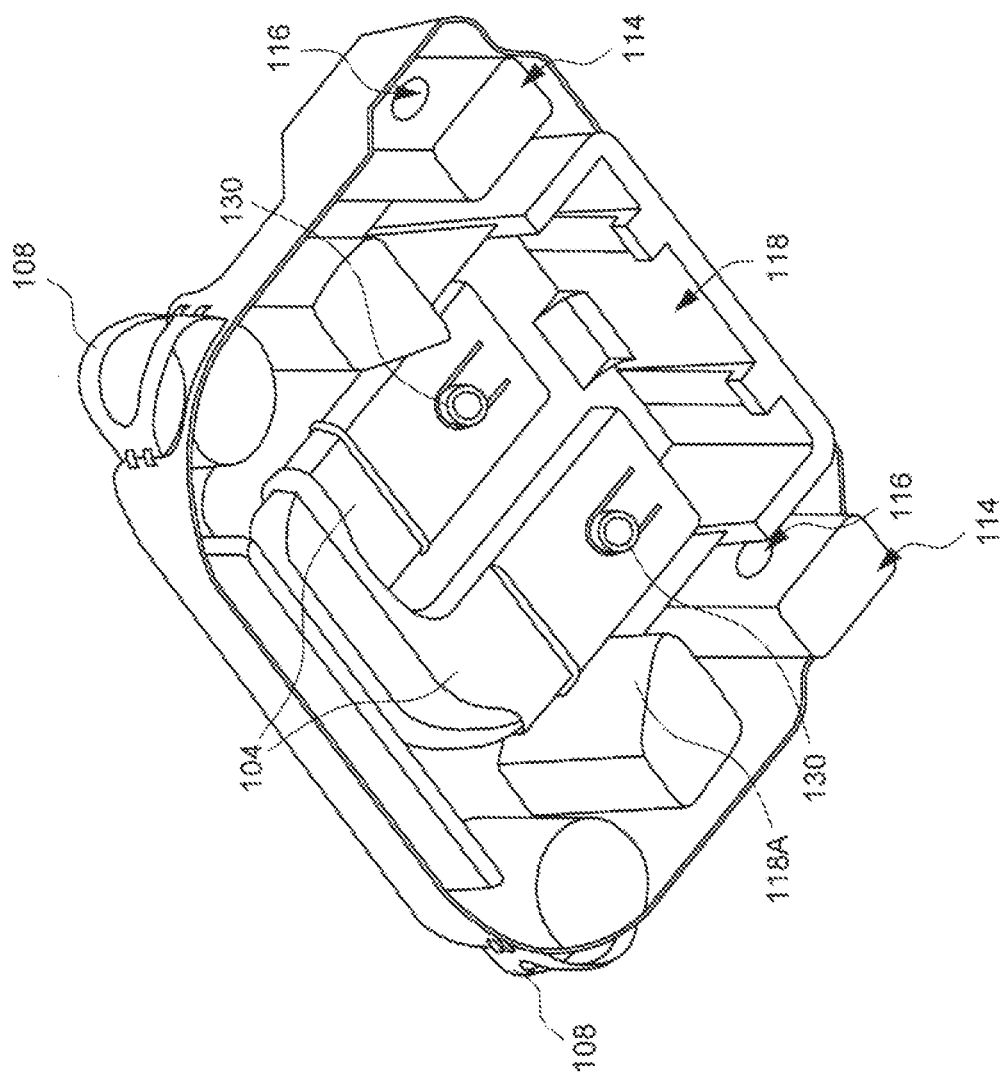
FIG. 1E is a schematic view of the first embodiment in a configuration where the armrests are received in the seat shell.

Referring to FIG. 1E, the armrests 104 can be conveniently placed in the storage cavity 118 when the booster seat 100 is being shipped or unused. In this configuration, the armrests 104 can be entirely contained and concealed in the storage cavity 118, so that the outer envelop of the booster seat 100 can be reduced and substantially match with the outer contour shape of the seat shell 102. As a result, the total size of the booster seat 100 can be reduced to be substantially equal to the size of the seat shell 102. Having a smaller volume, the booster seat 100 can be disposed in a smaller package box for storage or shipment. In case the booster seat 100 is to be shipped in batches (for example, from the manufacturer to the point of sales), this configuration can also allow to stack multiple booster seats 100 in a compact manner, as shown in FIG. 1F.

To assemble the armrest 104 with the seat shell 102, the armrest 104 can be first removed from the storage cavity 118. Then, the stem 104A can be respectively inserted from the upper side of the seat shell 102 into the mount socket 114 until the studs 130 respectively engage with the latch openings 116 and are exposed at the sides of the mount socket 114. Once the studs 130 engage with the latch openings 116, the armrests 104 can be securely locked with the seat shell 102 in a position where the arm resting portion 104B extends above the support surface 103 of the seat shell 102.

To detach the armrests 104, the studs 130 can be pushed inward to disengage from the latch openings 116. For facilitating access to the studs 130, specific clearance can be provided in the structure of the seat shell 102. For example, the sidewalls 118A of the storage cavity 118 that are adjacent to the latch openings 116 can include gaps 132 to facilitate access to the engaged studs 130. Once the studs 130 are disengaged from the latch openings 116, the unlocked armrests 104 can be entirely removed from the mount sockets 114 from the upper side of the seat shell 102.

FIGS. 2A through 2C are schematic views illustrating a second embodiment of a booster seat 200. The booster seat 200 is generally similar in structure to the embodiment described previously, including a seat shell 202 and armrests 204. The seat shell 202 can be formed in a single body, for example by injection or blow molding of plastic material. The upper side of the seat shell 202 can define a support surface 203 on which a child can be seated. This support surface 203 toward the rear of the seat shell 202 can also include slits 205 for detachably assembling a backrest (not shown). Left and right front corners of the seat shell 202 can respectively include recessed cavities 206 where cup holders 208 can be mounted to hold drinking bottles, cups or like containers. Moreover, right and left sides of the seat shell 202 can respectively include mount sockets 214 for assembling the armrests 204.

FIG. 2B is a partially enlarged view showing a bottom of the seat shell 202, and FIG. 2C is a partially enlarged view showing a bottom of the seat shell 202 without assembly of the armrest 204. As shown, each of the mount sockets 214 can include a pocket 215 that is closed at the lower side and opened at the upper side of the seat shell 202. The mount socket 214 can have opposite sidewalls provided with latch openings 216 for locking the armrests 204 in place.

Referring again to FIGS. 2A and 2B, the seat shell 202 can include an inner storage cavity 218 accessible from the lower side of the seat shell 202 and located in a central region between the two mount sockets 214. In one embodiment, the storage cavity 218 can be formed at the underside of the support surface 203 via molding of the seat shell 202. The storage cavity 218 can be at least partially delimited or surrounded by a plurality of sidewalls 218A, and have a size adapted to receive the placement of the armrests 204.

Similar to the embodiment described previously, the seat shell 202 can also include a plurality of pockets or recesses 221 formed at the upper side of the seat shell 202 to facilitate hand gripping of the seat shell 202 and provide additional bottom support.

Each of the armrests 204 can have a generally L-shape including an elongated stem 204A joined upward with a bent arm resting portion 204B. The stem 204A can have two opposite sidewalls respectively provided with protruding studs 226. Each of the studs 226 can have a tapered shape including an upper retainer surface 226A and a side angled surface 226B.

For assembling the armrest 204 with the seat shell 202, the stem 204A can be inserted from the upper side of the seat shell 202 into the associated mount socket 214. As the stem 204A is traveling through the mount socket 214, the studs 226 may be respectively squeezed and deformed by contact against the inner sidewalls of the mount socket 214 until they reach and permanently engage through the latch openings 216. Once engaged, the retainer surface 226A of each stud 226 can abut against an upper rim of the associated latch opening 216 to stop the stud 226. The armrest 204 can be thereby locked with the seat shell 20 in a permanent manner, rather than detachably as described in the previous embodiment.

FIGS. 3A through 3E are schematic views illustrating a third embodiment of a booster seat 300. Like the embodiments previously described, the booster seat 300 can include a seat shell 302 and armrests 304. Left and right front corners of the seat shell 302 can be respectively assembled with cup holders 306 to hold drinking bottles, cups or like containers. In addition, the cup holders 306 may also be constructed such that the bottom surface thereof can rest in contact with the seat of the vehicle on which the booster seat 300 is installed. In particular, the bottom surface of each cup holder 306 can be formed with a curved shape that can match with that of the vehicle seat, whereby additional support can be provided to improve stability of the booster seat 300.

A variety of fastener systems may be used to attach the cup holders 306 with the seat shell 302. FIG. 3D illustrates one example in which each of the cup holders 306 can be formed as a cup-like receptacle having an outer surface provided with a retainer slot 308 that is opened at a lower end, whereas an outer side surface of the seat shell 302 can have a protruding T-shaped rib 310 adapted to engage with the retainer slot 308. The cup holder 306 can be assembled with the seat shell 302 for use by engaging the T-shaped rib 310 with the retainer slot 308 from its lower end. When it is unused or convenient storage of the booster seat 300 is needed, the cup holder 306 can be pulled upward to become detached from the seat shell 302. While one specific example has been illustrated, it will be understood that any fasteners for attaching the cup holder 306 may be suitable in general.

Figure 3B:
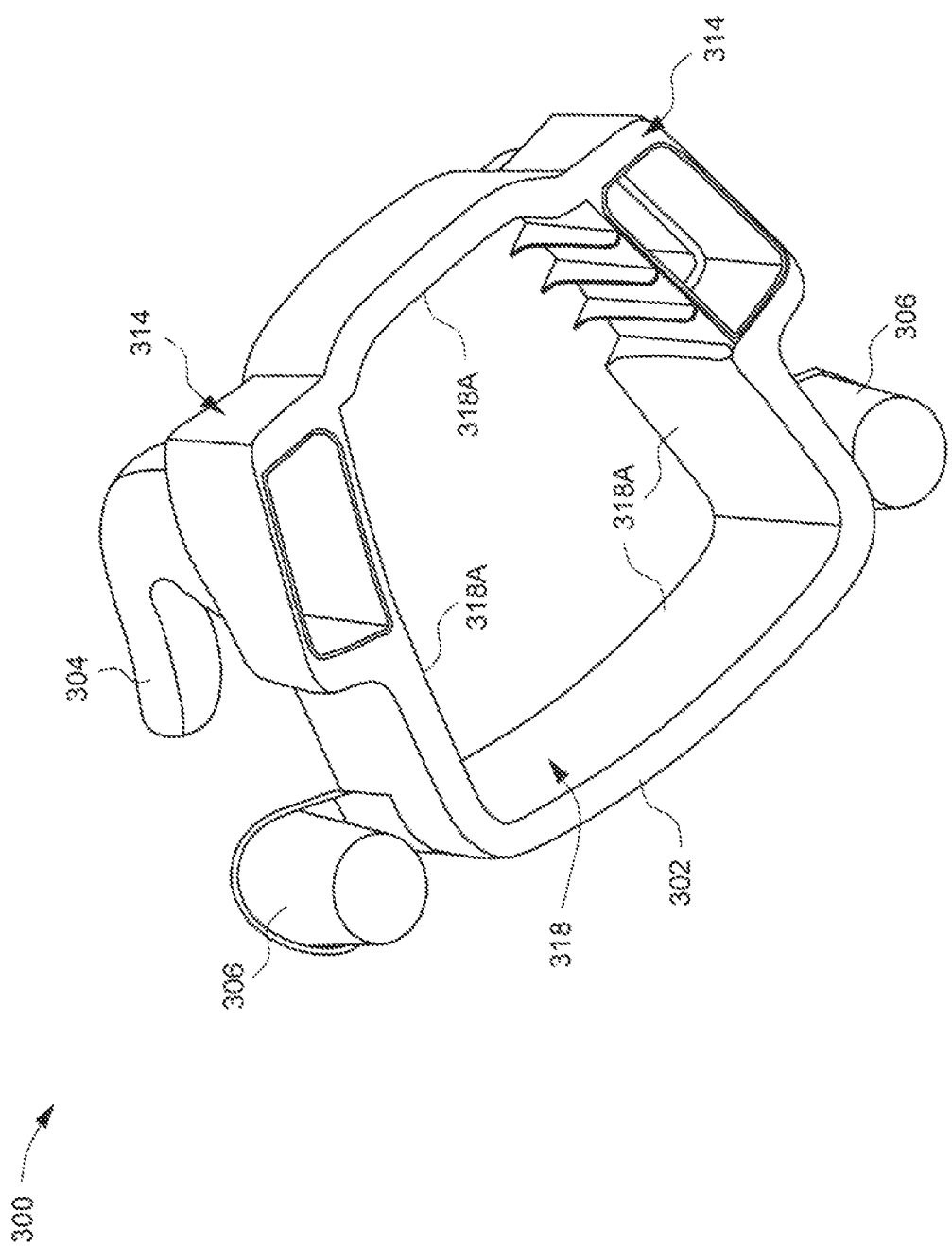
FIG. 3B is a perspective view illustrating a bottom side of the third embodiment.

Referring to FIGS. 3A through 3C, right and left sides of the seat shell 302 can include mount sockets 314 near the rear of the seat shell 302. In this embodiment, each of the mount sockets 314 can include an aperture 315 that is opened on the upper and lower sides of the seat shell 302. Opposite sidewalls of the mount sockets 314 can include latch openings 316 for locking the armrests 304 in place.

As better shown in FIG. 3B, the seat shell 302 can include an inner storage cavity 318 accessible from the underside and located between the two mount sockets 314. In one embodiment, the storage cavity 318 can be defined at the underside of the support surface 303 at molding of the seat shell 302. The storage cavity 318 can be at least partially delimited or surrounded by a plurality of sidewalls 318A at the front, rear, right and left sides of the seat shell 302. The storage cavity 318 can be sized to receive the armrests 304 and the cup holders 306 in the outer envelop of the seat shell 302 for facilitating the storage of the booster seat 300.

Referring to FIG. 3C, each of the armrests 304 can have a stem 304A, a bent arm resting portion 304B joined with an upper end of the stem 304A, and an enlarged base 304C joined with a lower end of the stem 304A. As the base 304C is larger than the stem 304A, a region joining the base 304C with the stem 304A can form a shoulder 320. Opposite sidewalls of the stem 304A can also include protruding studs 322 adapted to engage with the latch openings 316 of the mount socket 314 for locking the armrest 304 in place.

As shown in FIG. 3E, the armrests 304 may be placed in the storage cavity 318 of the seat shell 302 when the booster seat 300 is being shipped or unused. In addition to the armrests 304, the cup holders 306 can also be disassembled from the seat shell 302 and stowed in the storage cavity 318. As the armrests 304 and cup holders 306 can be entirely contained in the storage cavity 318, the outer envelop of the booster seat 300 can substantially match with the outer contour shape of the seat shell 302. As a result, the size of the booster seat 300 can be substantially equal to that of the seat shell 302.

For assembling the armrests 304 with the seat shell 302, the armrests 304 are first removed from the storage cavity 318. Then, each of the armrests 304 can be inserted into the aperture 315 of the associated mount socket 314 from the underside of the seat shell 302, and be rotated until the arm resting portion 304B properly extends outward from the upper side and the studs 322 engage with the latch openings 316. The armrests 304 can be thereby locked in place, the base 304C being restrained at the lower side of the seat shell 302, and the arm resting portion 304B extending above the support surface 303 of the seat shell 302. In case of a crash scenario where upward forces are applied on the armrest 304 from the underside of the seat shell 302, the shoulder 320 of the base 304C can abut against an opposing rim of the aperture 315 in the mount socket 314, which can provide effective resistance in addition to the mechanical strength of the snap engagement between the studs 322 and the latch openings 316. To add further convenience features, the cup holder 306 can also be assembled with the seat shell 302 by engaging the T-shaped rib 310 with the retainer slot 308.

FIGS. 4A through 4D are schematic views illustrating a fourth embodiment of a booster seat 400. The booster seat 400 can include a seat shell 402 and two armrests 404. In this embodiment, the seat shell 402 and the armrests 404 are constructed such that the armrests 404 can be nested into an interior of the seat shell 402 and assembled in a use configuration at right and left sides of the seat shell 402.

Figure 4A:
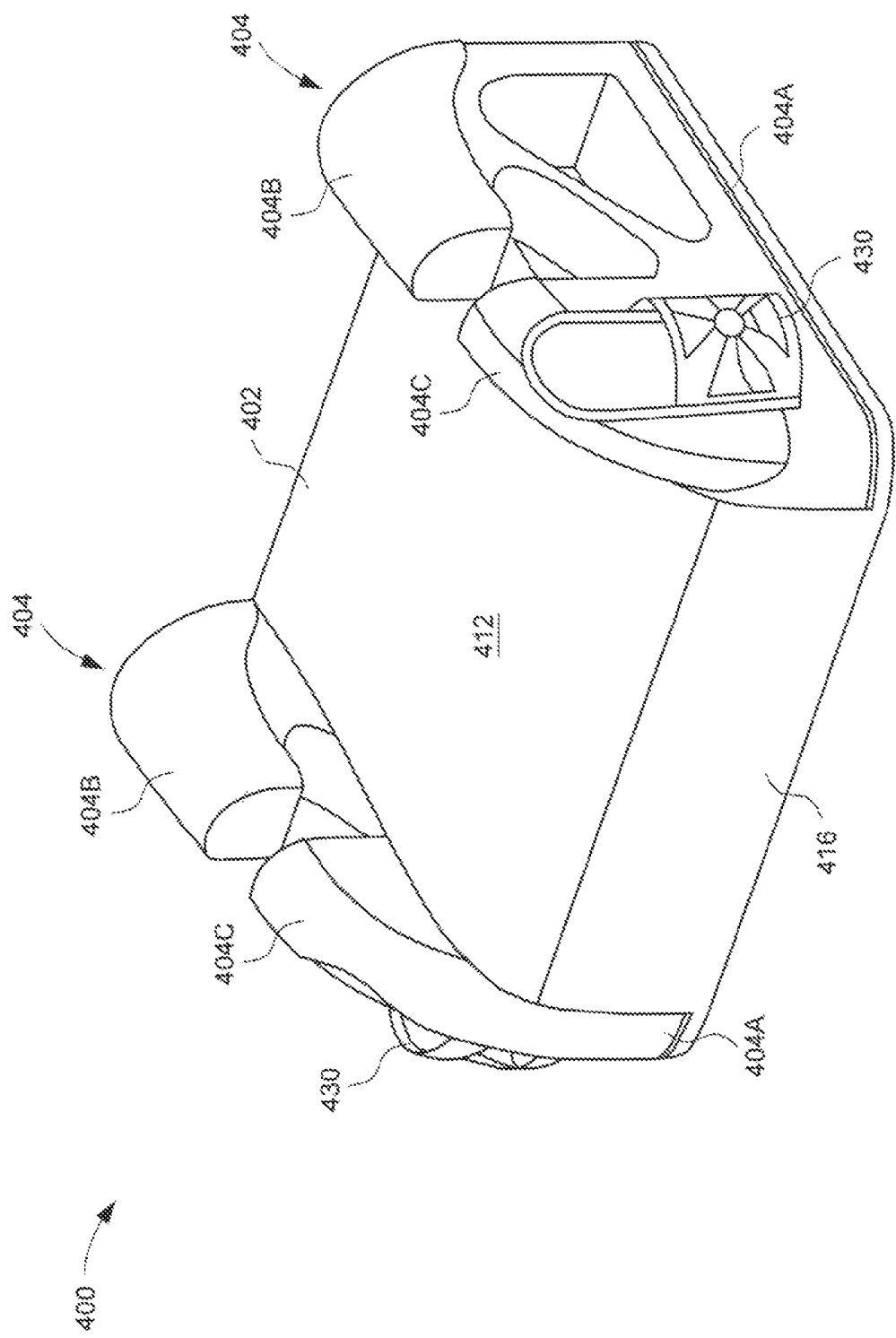
FIG. 4A is a perspective view illustrating a fourth embodiment of a booster seat.
Figure 4B:
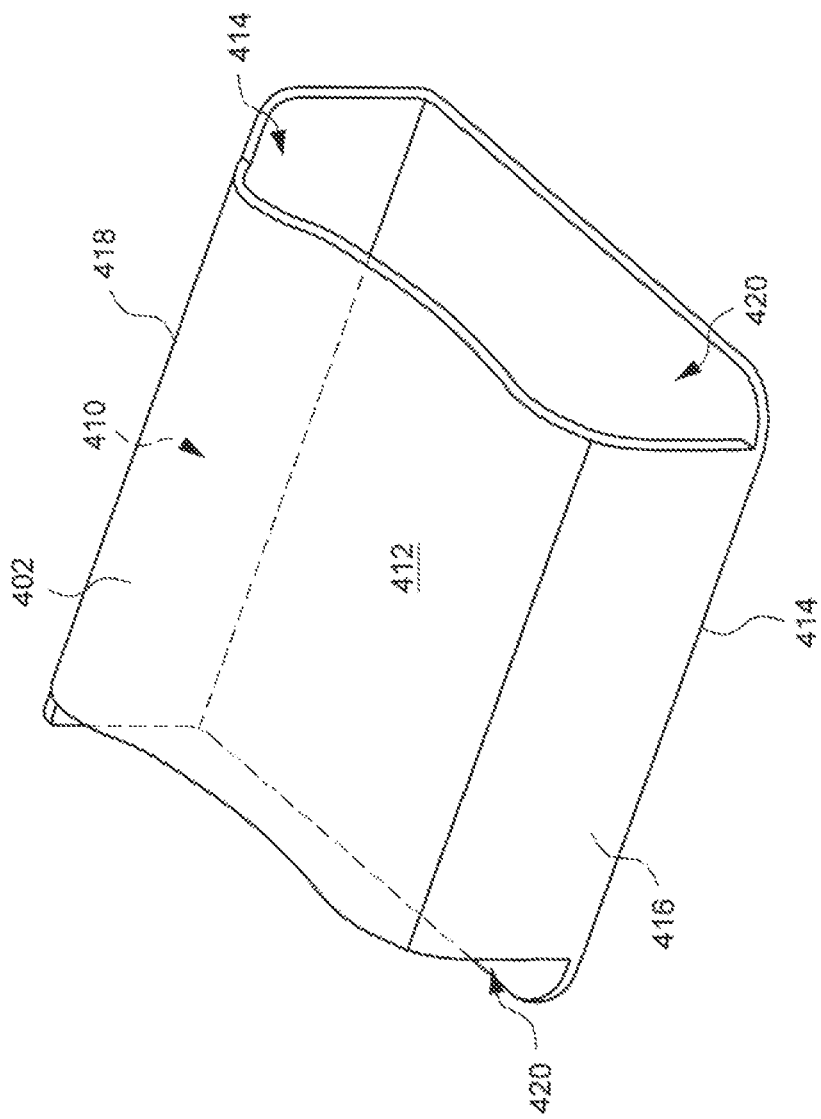
FIG. 4B is a schematic view illustrating the construction of a seat shell used in the fourth embodiment.

As better shown in FIG. 4B, the seat shell 402 can be formed integrally as a hollow body, for example by injection or blow molding of plastic material. The seat shell 402 can have a generally oblong or square shape, including an inner storage cavity 410 sized to receive the armrests 404. The storage cavity 410 can be delimited at least partially by upper and lower envelop portions 412 and 414, and front and rear envelop portions 416 and 418 of the seat shell 402. The upper and lower envelop portions 412 and 414 are respectively joined with the front and rear envelop portions 416 and 418 to define the outer contour shape of the seat shell 402, the upper envelop portion 412 defining the support surface where a child can be seated. Insert openings 420 are respectively formed at the right and left sides of the seat shell 402 communicating with the storage cavity 410. In this manner, the storage cavity 410 can be accessible via the insert openings 420 to receive the placement of the armrests 404.

Figure 4C:
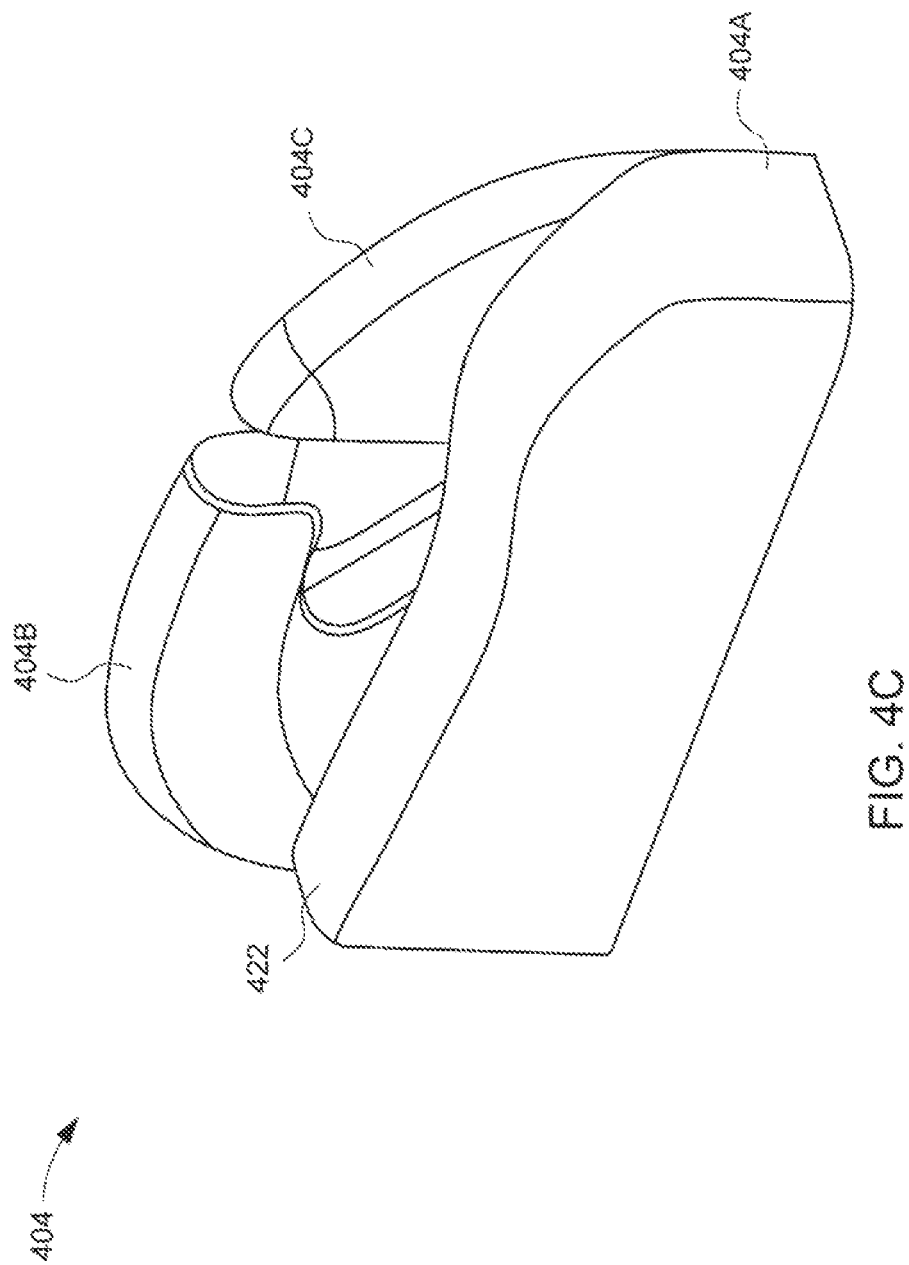
FIG. 4C is a schematic view illustrating the construction of an armrest used in the fourth embodiment.

As better shown in FIG. 4C, each of the armrests 404 can include an enlarged base 404A, and a bent arm resting portion 404B joined with the base 404A. The base 404B can include a lateral protrusion 422 adapted to engage through one corresponding insert opening 420 to hold the armrest 404 at one side of the seat shell 402. As shown, the armrest 404 can also optionally include a cup holder portion 404C joined with the base 404A (as shown in FIG. 4A). The cup holder portion 404C can be formed as a raised portion that is located in front of the arm resting portion 404B, and includes a recess against which a cup holder 430 formed as a bracket can assemble to retain a drinking cup, bottle or the like. In one embodiment, the armrest 404, including the base 404A, the arm resting portion 404B, the cup holder portion 404C and the lateral protrusion 422, can be formed in a single body. The cup holder 430 can be provided as an accessory part that can be assembled with the cup holder portion 404C.

Figure 4D:
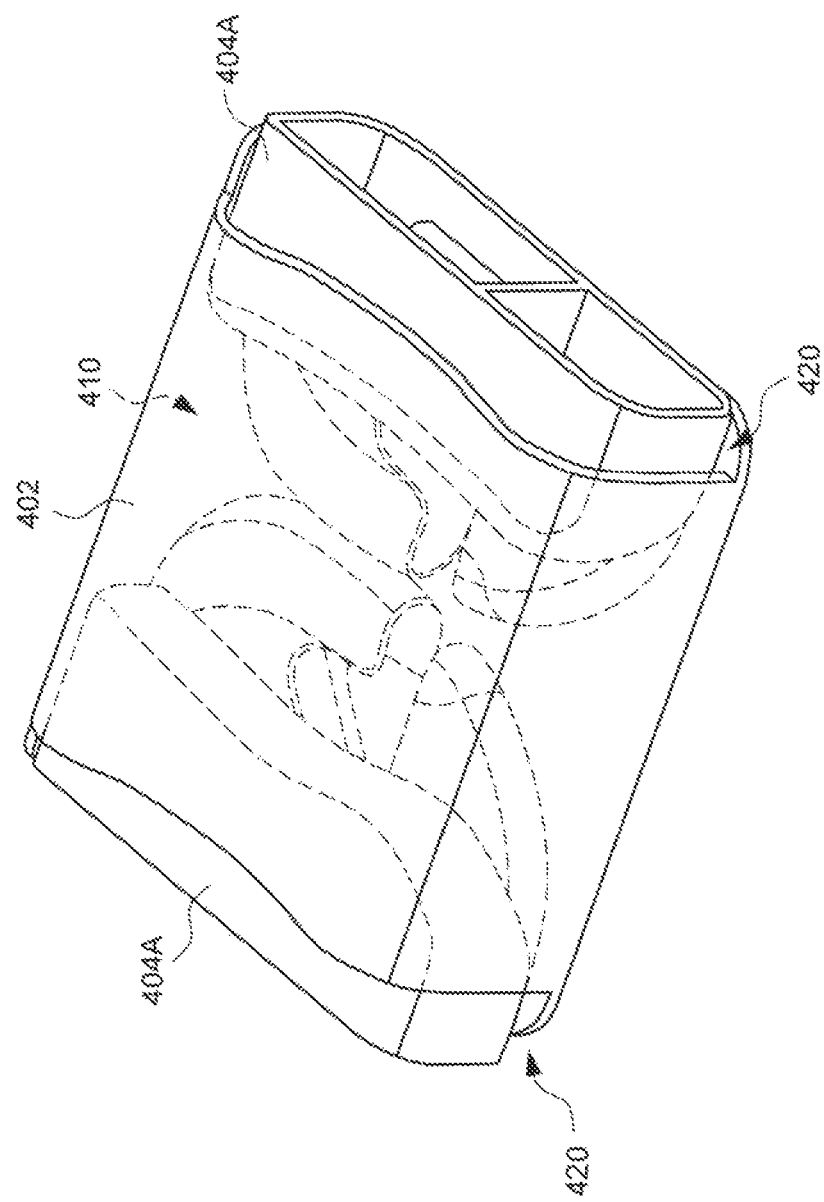
FIG. 4D is a schematic view of the fourth embodiment in a configuration where the armrests are received in the seat shell.

As shown in FIG. 4D, the armrests 404 can be conveniently placed in the storage cavity 410 when the booster seat 400 is being shipped or unused. In this configuration, each of the armrests 404 can be laid down horizontal and nest through the corresponding insert opening 420 into the storage cavity 410 such that the arm resting portion 404B and the cup holder portion 404C are substantially confined in the storage cavity 410, whereas a bottom of the base 404A remains visible from the insert opening 420. Accordingly, the outer envelop of the booster seat 400 can substantially match with the outer contour shape of the seat shell 402, which occupies a smaller volume.

For assembling the armrests 404 with the seat shell 402, the armrests 404 can be removed from the storage cavity 410 via the insert openings 420, and then erected vertical. Subsequently, the lateral protrusion 422 can be engaged through the insert opening 420 of the seat shell 202. In one embodiment, the lateral protrusion 422 and the insert opening 420 can be designed to complementarily mate with each other via an interference fit so that the armrest 404 can be securely held with the seat shell 402 in a position where the arm resting portion 404B lies above the support surface of the seat shell 402.

FIGS. 5A and 5B are schematic views illustrating a fifth embodiment of a booster seat 500. Like previously described, the booster seat 500 can include a seat shell 502, two armrests 504 and cup holders 506. The seat shell 502 can include a storage cavity 514 (shown with phantom lines in FIG. 5B) accessible from an underside of the seat shell 502 and opened at the right and left sides of the seat shell 502 at locations corresponding to the positions of the armrests 504. In this embodiment, the seat shell 502 and armrests 504 are constructed such that the armrests 504 can be pivotally coupled with the right and left flanks of the seat shell 502 via pivot links 516. Each of the pivot links 516 can define a pivot axis that extends generally from the rear to the front of the seat shell 502. As shown in FIG. 5A, each of the armrests 504 can be set to a deployed position erected above an upper surface of the seat shell 502 for use. As shown in FIG. 5B, the armrests 504 can be operable to rotate from the deployed position toward the bottom of the seat shell 502 (as shown with phantom lines) until they reach a folded position received in the storage cavity 514. Once the armrests 504 are adjusted to the folded position, the outer envelop of the booster seat 500 can substantially match with the outer contour shape of the seat shell 502.

FIG. 6A through 6F are schematic views illustrating a sixth embodiment of a booster seat 600. Like the fifth embodiment described in FIGS. 5A and 5B, the booster seat 600 can include a seat shell 602, two armrests 604 that are pivotally coupled with the right and left flanks of the seat shell 602 via pivot links 606, and cup holders 608. An upper side of the seat shell 602 can be detachably mounted with a seat board 610 on which a child can be seated. In one embodiment, the surface of the seat board 610 can include a plurality of through-holes or apertures 612 so as to provide a breathable surface for increased seating comfort.

Figure 6B:
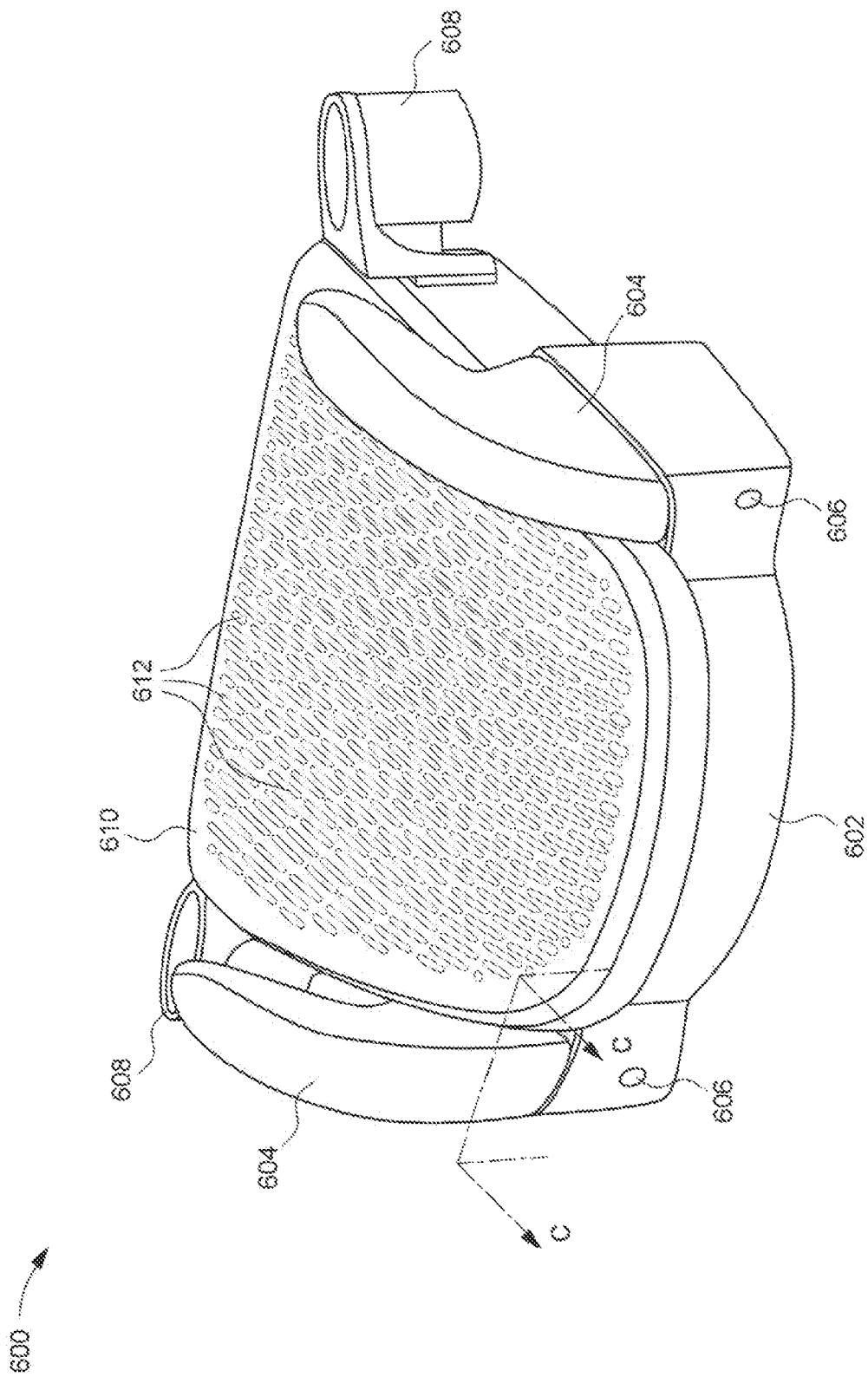
FIG. 6B is another perspective view of the booster seat according to the sixth embodiment.
Figure 6C:
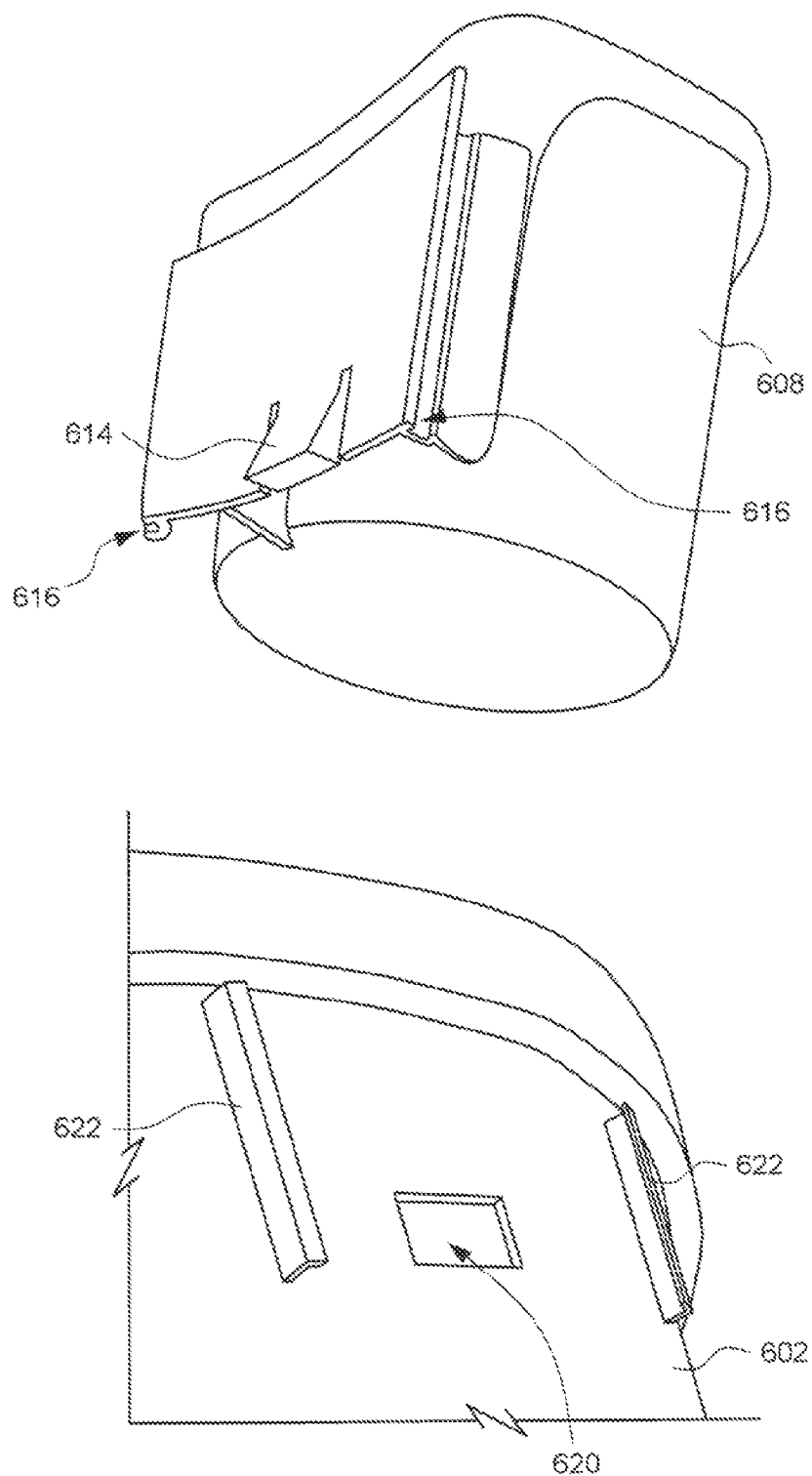
FIG. 6C is a schematic view illustrating the assembly of a cup holder with the booster seat shown in FIG. 6A.

As shown in FIG. 6C, each of the cup holders 608 can be detachably mounted with a side surface of the seat shell 602. In one embodiment, the cup holder 608 can include a detent portion 614 provided with a stud, and two parallel elongated slots 616 provided at two opposite sides of the detent portion 614. A corresponding outer side surface of the seat shell 602 can include an opening 620, and two parallel guide ribs 622 provided at two opposite sides of the opening 620. The ribs 622 can cooperate with the elongated slots 616 to guide a sliding movement of the cup holder 608, until the detent portion 614 engages with the opening 620 to hold the cup holder 608 in place. To dismount the cup holder 608, the detent portion 614 can be pressed from the inner side of the seat shell 602 to disengage from the opening 620. The cup holder 608 then can be removed from the outer side surface of the seat shell 602.

Figure 6D:
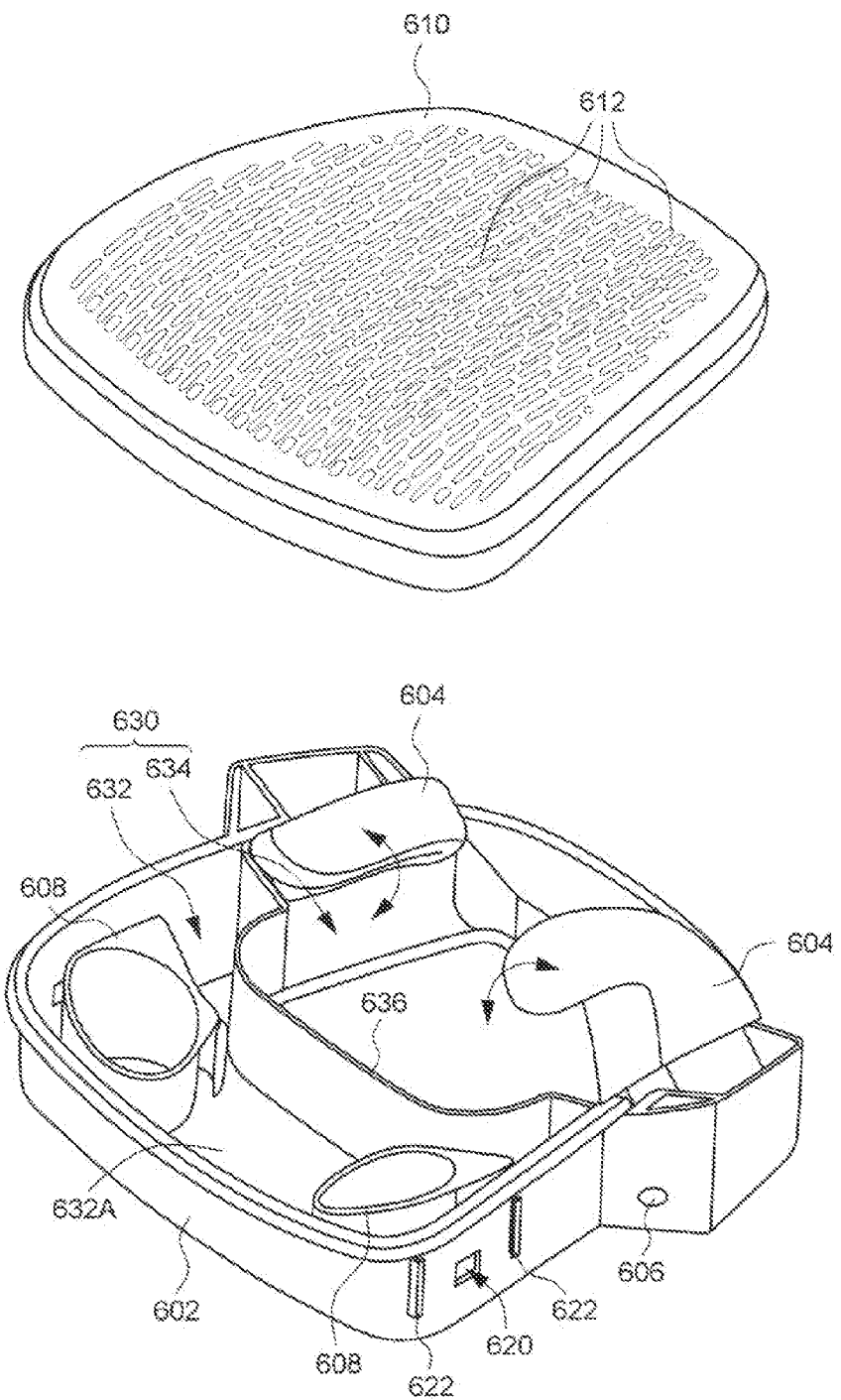
FIG. 6D is a schematic view illustrating the storage of armrests and cup holders in the booster seat shown in FIG. 6A.

Referring to FIGS. 6D and 6E, the interior of the seat shell 602 can include a storage cavity 630 adapted to receive the armrests 604 and the cup holders 608. In one embodiment, the storage cavity 630 can include a first compartment 632 having a bottom surface 632A, and a second compartment 634 opened at the underside and separated from the first compartment 632 via a sidewall 636.

The seat board 610 can be detached from the upper side of the seat shell 602 such that the storage cavity 630 is opened and accessible from the upper side. The two armrests 604 then can be rotated about their respective pivot axis toward the upper side of the seat shell 602, and then respectively fold into the second compartment 634 of the storage cavity 630. The cup holders 608 can also be detached from the respective side surfaces of the seat shell 602, and then disposed in the first compartment 632 of the storage cavity 630. Once the armrests 604 and the cup holders 608 are suitably disposed in the storage cavity 630, the seat board 610 can be mounted to cover the upper side of the seat shell 602 and close the storage cavity 630 from the upper side. Accordingly, the outer envelop of the booster seat 600 can substantially match with the outer contour shape of the seat shell 602 which is upwardly closed by the seat board 610. While the booster seat 600 is arranged in this configuration, a child can be seated on the seat board 610 without using the armrests 604 and cup holders 608.

When the use of the armrests 604 and/or the cup holders 608 is needed, the seat board 610 can be detached from the seat shell 602. The armrests 604 then can be rotated outward until they reach the respective deployed positions shown in FIG. 6A. The cup holders 608 can also be installed on the side surfaces of the seat shell 602 in the manner described above. Once the armrests 604 are suitably deployed, the seat board 610 can be mounted at the upper side of the seat shell 602 to upwardly close the storage cavity 630. Folding of the armrests 604 into the storage cavity 630 can be thereby prevented.

FIG. 6F is a schematic cross-sectional view taken along section C shown in FIG. 6B. In one embodiment, the seat board 610 can also be constructed to cooperate with each of the armrests 604 disposed in their deployed positions. For example, an outer peripheral sidewall of the seat board 610 can include a resilient detent portion 640, and a lower portion of the armrest 604 can have an inner side surface provided with a recess 642. When the armrest 604 is disposed in the deployed position and the seat board 610 installed at the upper side of the seat shell 602, the detent portion 640 can resiliently engage with the recess 642. Upward removal of the seat board 610 can be thereby blocked, and the seat board 610 can be securely held in place. To remove the seat board 610, the outer peripheral sidewall of the seat board 610 from which is formed the detent portion 640 can be operated so as to cause the detent portion 640 to disengage from the recess 642. The seat board 610 then can be detached from the seat shell 602 to uncover the storage cavity 630.

While the seat board 610 has been described as being removably attached with the seat shell 602, other constructions are possible. For example, alternate embodiments may also have the seat board movably connected with the seat shell, e.g., via a pivot or sliding connection. In this manner, the seat board may also be operable to the open and close the storage cavity.

At least one advantage of the booster seats described herein is the ability to provide a storage cavity in the seat shell that can receive the armrests and cup holders for storage. Accordingly, the booster seats can be packed in smaller boxes, which can effectively reduce the shipment cost.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A child booster seat comprising:
a seat shell having an upper surface, a lower surface, an inner storage cavity that is located between the upper surface and the lower surface, and an opening formed through a flank of the seat shell and communicating with the storage cavity, the opening being defined by a contour wall; and
an armrest operable to detachably assemble with the seat shell, the armrest including a base, an arm resting portion joined with the base, and a lateral protrusion connected with the base of the armrest and having a front and a rear end respectively located near a front and a rear edge of the base, the armrest being adapted to nest through the opening into the storage cavity such that the arm resting portion is substantially confined in the storage cavity and a bottom of the base remains adjacent to the opening, wherein the armrest has a use configuration and a storage configuration, the armrest when in the use configuration is assembled with the seat shell with the lateral protrusion in interference fit with at least a portion of the contour wall so that the armrest is held in a position extending above the upper surface, and the armrest when in the storage configuration is received through the opening into the storage cavity.

2. The booster seat according to claim 1, wherein the lateral protrusion complementarily mates with the opening when the armrest is in the position extending above the seat shell.

3. The booster seat according to claim 1, further including a second armrest and the seat shell further includes a second opening communicating with the storage cavity, the two armrests being operable to respectively insert through the two openings for placement into the storage cavity.

4. The booster seat according to claim 3, wherein the seat shell has an upper surface, a lower surface, and a front and a rear portion that are respectively connected with the upper and lower surfaces, the storage cavity being at least partially delimited between the front and rear portions, and the two openings being respectively formed at a left and a right side of the seat shell between the upper and lower surfaces.

5. The booster seat according to claim 1, wherein the armrest, including the base, the arm resting portion and the lateral protrusion, is formed in a single body.

6. The booster seat according to claim 1, wherein the armrest further includes a cup holder portion joined with the base, the arm resting portion and the cup holder portion being substantially confined in the storage cavity when the armrest is stored in the storage cavity.

7. A child booster seat comprising:
a seat shell having a support surface for seating a child, an interior provided with a storage cavity, and a flank having an insert opening communicating with the storage cavity; and
an armrest having a base, an arm resting portion joined with the base, and a lateral protrusion connected with the base and having a front and a rear end respectively located near a front and a rear edge of the base, wherein the armrest is operable to stow into the storage cavity such that the arm resting portion is substantially confined in the storage cavity and a bottom of the base remains visible from the insert opening, the armrest being movable through the insert opening of the flank of the seat shell to stow in the storage cavity, and the armrest is further assemblable with the seat shell with the lateral protrusion engaged from an outside of the seat shell into the insert opening to support the armrest in a position extending above the support surface.

8. The booster seat according to claim 7, wherein a total size of the booster seat is substantially equal to that of the seat shell when the armrest is stowed in the storage cavity.

9. The booster seat according to claim 7, wherein the seat shell has a lower surface and an upper surface, the storage cavity is located between the upper surface and the lower surface and is accessible via the insert opening that is formed at a left or right side of the seat shell.

10. The booster seat according to claim 7, wherein the lateral protrusion complementarily mates with the insert opening when the armrest is in the position extending above the support surface.

11. The booster seat according to claim 7, wherein the armrest, including the base, the arm resting portion and the lateral protrusion, is formed in a single body.

12. The booster seat according to claim 7, wherein the armrest further includes a cup holder portion joined with the base, the arm resting portion and the cup holder portion being substantially confined in the storage cavity when the armrest is stored in the storage cavity.

13. The booster seat according to claim 7, wherein the lateral protrusion is in interference fit through the insert opening when the armrest is in the position extending above the support surface of the seat shell.

14. A child booster seat comprising:
a seat shell having an upper surface for seating a child, a lower surface below the upper surface, a storage cavity located between the upper and the lower surface, a flank extending between the upper and lower surfaces, and an opening that is provided through the flank and communicates with the storage cavity; and an armrest having a use configuration and a storage configuration, the armrest including a base, an arm resting portion joined with the base, and a lateral protrusion connected with the base and having a front and a rear end respectively located near a front and a rear edge of the base, wherein the armrest when in the use configuration has the lateral protrusion engaged from an outside of the seat shell into the opening of the seat shell so as to support the armrest in a position extending above the upper surface, and the armrest is movable through the opening of the flank to stow in the storage cavity in the storage configuration, the arm resting portion being substantially confined in the storage cavity and a bottom of the base remaining visible from the opening in the storage configuration.

15. The booster seat according to claim 14, wherein the lateral protrusion engaging into the opening of the seat shell complementarily mates with the opening when the armrest is in the use configuration.

16. The booster seat according to claim 14, wherein the armrest further includes a cup holder portion joined with the base, the arm resting portion and the cup holder portion being substantially confined in the storage cavity when the armrest is stored in the storage cavity.

17. The booster seat according to claim 14, wherein the seat shell has a front and a rear portion that are respectively connected with the upper and lower surfaces, the storage cavity being at least partially delimited between the front and rear portions, and the opening being located at a left or right side of the seat shell.

18. The booster seat according to claim 14, wherein the lateral protrusion of the armrest is in interference fit through the opening when the armrest is in the position extending above the upper surface of the seat shell.

19. The booster seat according to claim 14, wherein the base has a bottom that lies adjacent to the lower surface of the seat shell when the armrest is assembled with the seat shell.

* * * * *